US011617999B2

(12) United States Patent
Sharpe et al.

(10) Patent No.: US 11,617,999 B2
(45) Date of Patent: Apr. 4, 2023

(54) EDGE CHIP

(71) Applicant: CYTONOME/ST, LLC, Bedford, MA (US)

(72) Inventors: Johnathan Charles Sharpe, Hamilton (NZ); Donald Francis Perrault, Jr., Brighton, MA (US)

(73) Assignee: CYTONOME/ST, LLC, Bedford, MA (US)

( * ) Notice: Subject to any disclaimer, the term of this patent is extended or adjusted under 35 U.S.C. 154(b) by 218 days.

(21) Appl. No.: 17/018,760

(22) Filed: Sep. 11, 2020

(65) Prior Publication Data
US 2021/0077973 A1 Mar. 18, 2021

Related U.S. Application Data

(60) Provisional application No. 62/899,469, filed on Sep. 12, 2019.

(51) Int. Cl.
*B01J 19/00* (2006.01)
*B01L 3/00* (2006.01)
*G01N 15/14* (2006.01)

(52) U.S. Cl.
CPC ..... *B01J 19/0093* (2013.01); *B01L 3/502715* (2013.01); *G01N 15/1404* (2013.01); *B01J 2219/0097* (2013.01); *B01J 2219/00826* (2013.01); *B01J 2219/00891* (2013.01); *B01J 2219/00934* (2013.01); *B01L 2300/08* (2013.01)

(58) Field of Classification Search
CPC ............ B01L 3/502715; B01L 3/5027; B01L 2300/08; B01J 19/0093; B01J 2219/0097; G01N 15/1404
See application file for complete search history.

(56) References Cited

U.S. PATENT DOCUMENTS

| 2012/0277902 | A1 | 11/2012 | Sharpe et al. | |
| 2014/0273179 | A1 | 9/2014 | Sharpe et al. | |
| 2014/0309782 | A1* | 10/2014 | Sharpe | G01N 15/1404 700/266 |
| 2014/0339445 | A1* | 11/2014 | Sharpe | G01N 15/1484 250/575 |

* cited by examiner

Primary Examiner — Brian J. Sines
(74) Attorney, Agent, or Firm — McCarter & English, LLP

(57) ABSTRACT

Systems and methods taught herein enable simultaneous forward and side detection of light originating within a microfluidic channel disposed in a substrate. At least a portion of the microfluidic channel is located in the substrate relative to a first side surface of the substrate to enable simultaneous detection paths with respect to extinction (i.e., 0°) and side detection (i.e., 90°). The location of the microfluidic channel as taught herein enables a maximal half-angle for a ray of light passing from a center of the portion of the microfluidic channel through the first side surface to be in a range from 25 to 90 degrees in some embodiments. By placing at least the portion of the microfluidic channel proximate to the side surface of the substrate, a significantly greater proportion of light emitted or scattered from a particle within the microfluidic channel can be collected and imaged on a detector as compared to conventional particle processing chips.

38 Claims, 24 Drawing Sheets

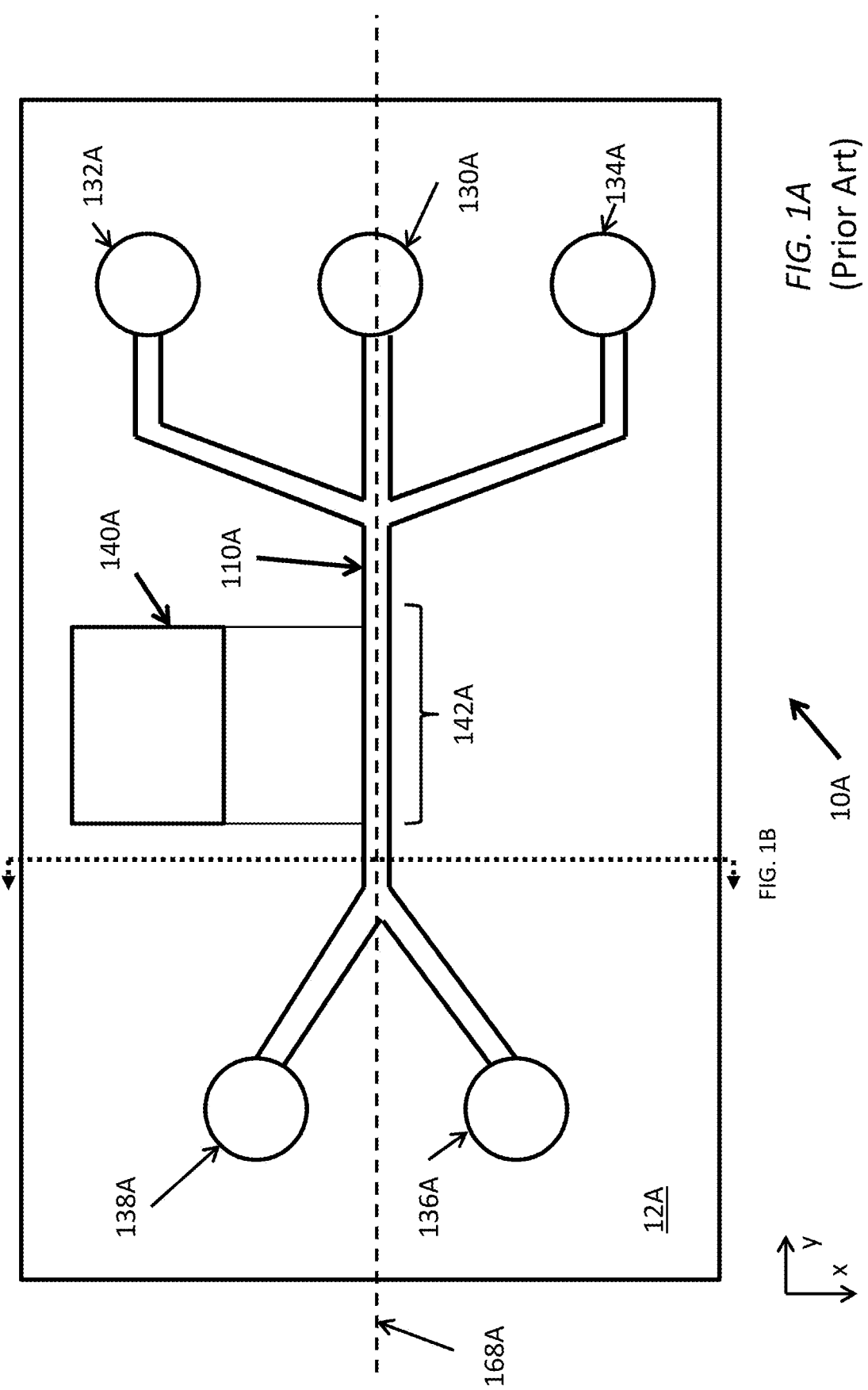

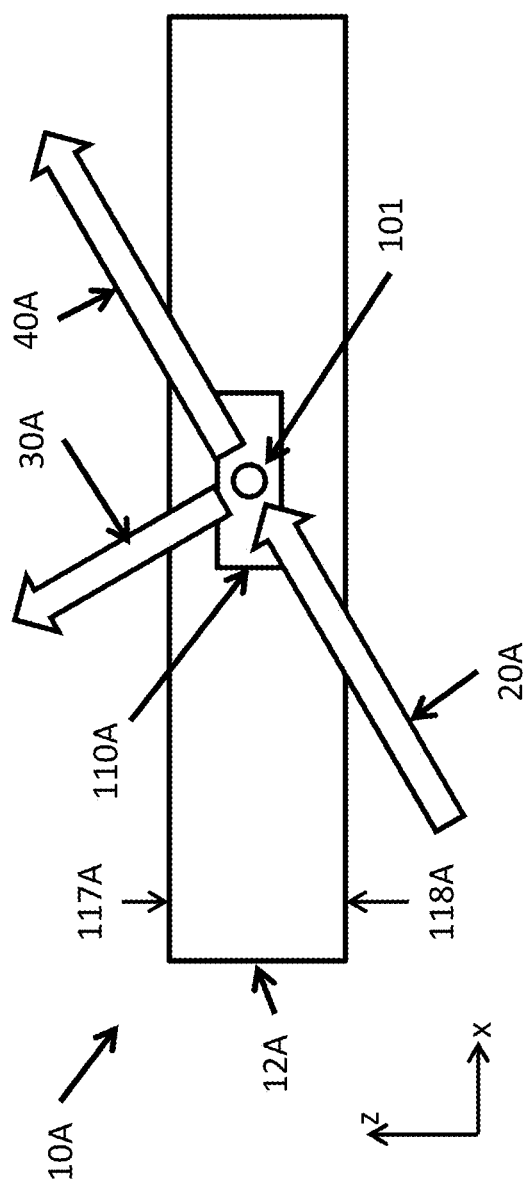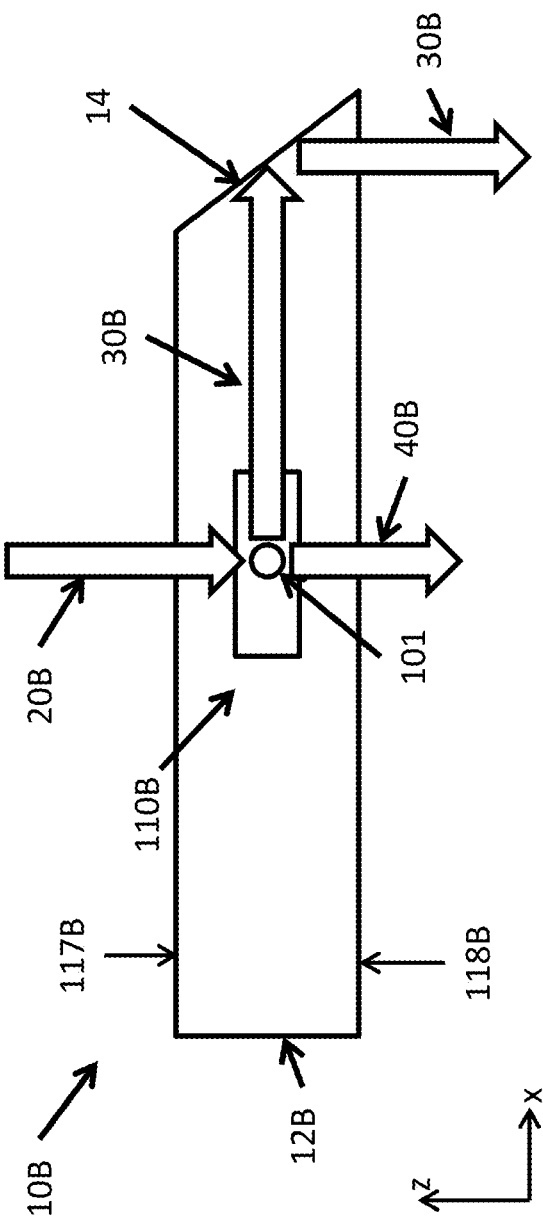

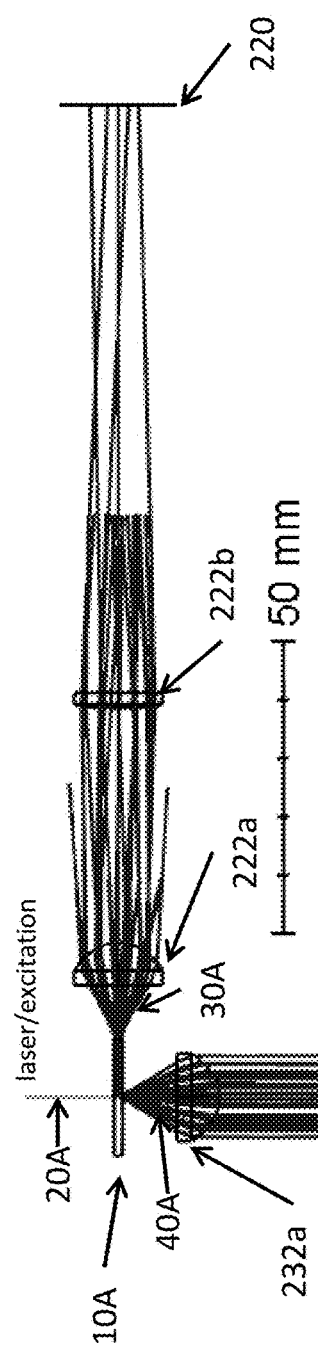
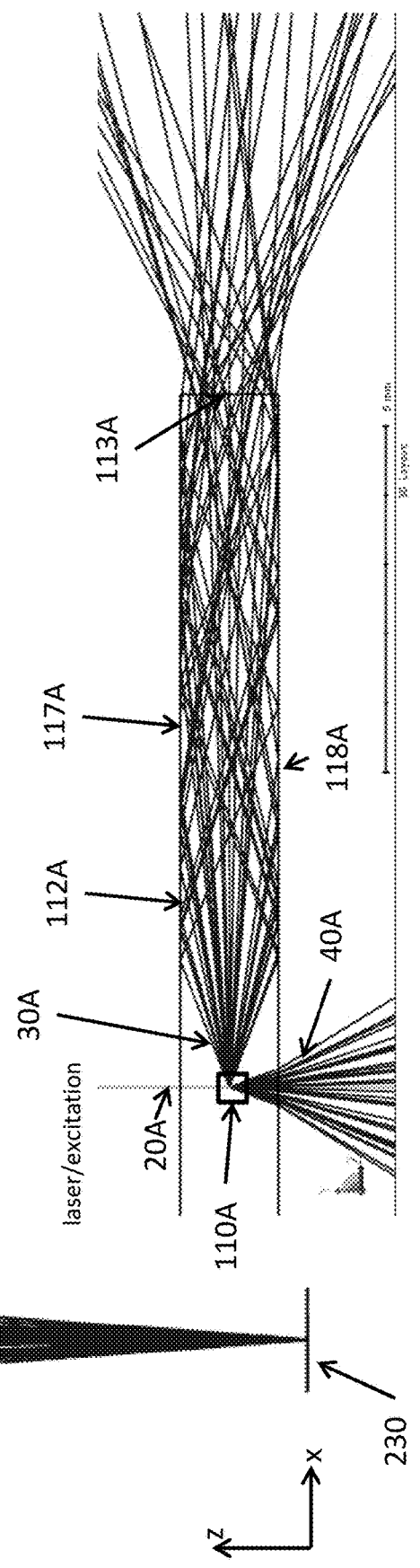
FIG. 5A
FIG. 5B

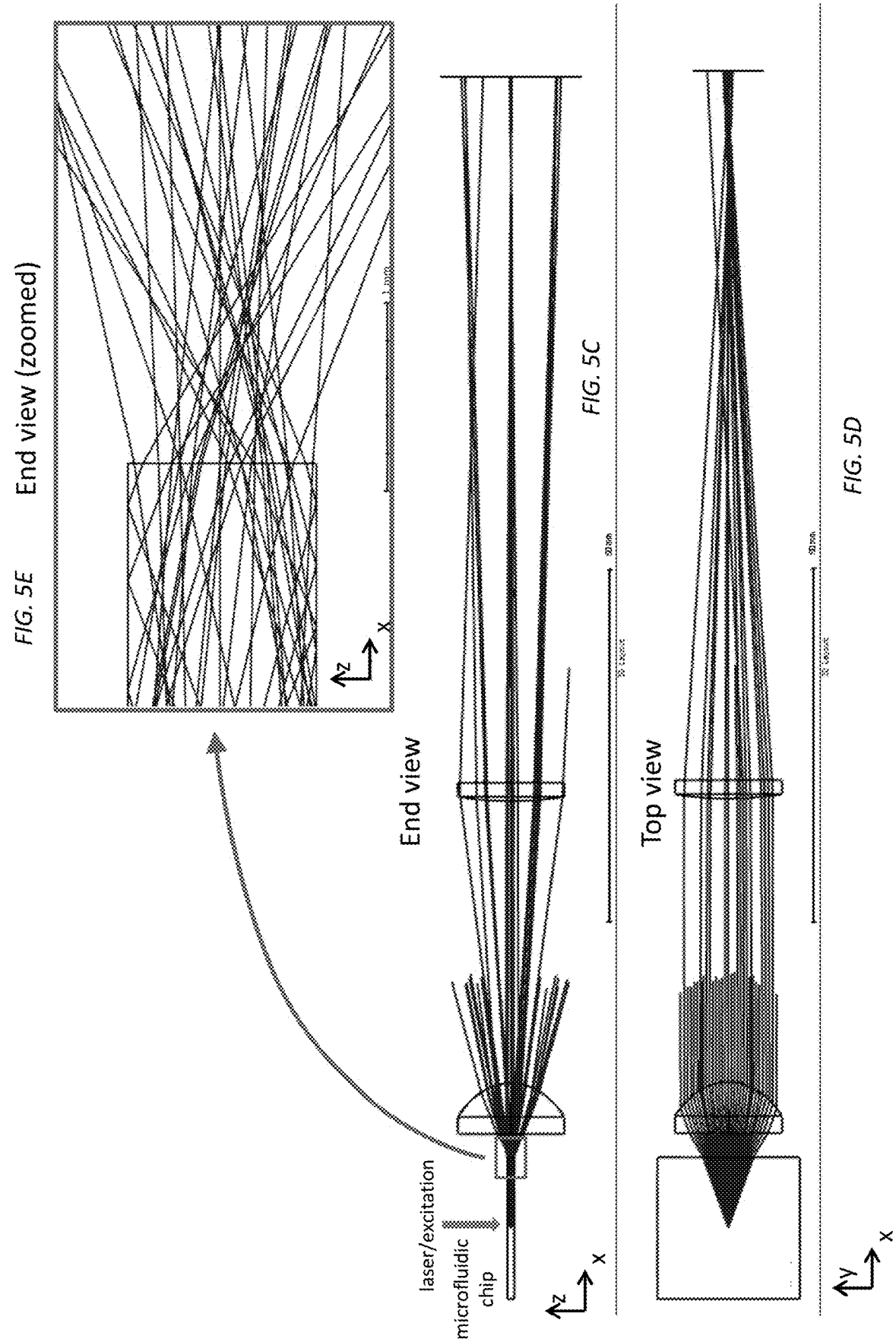

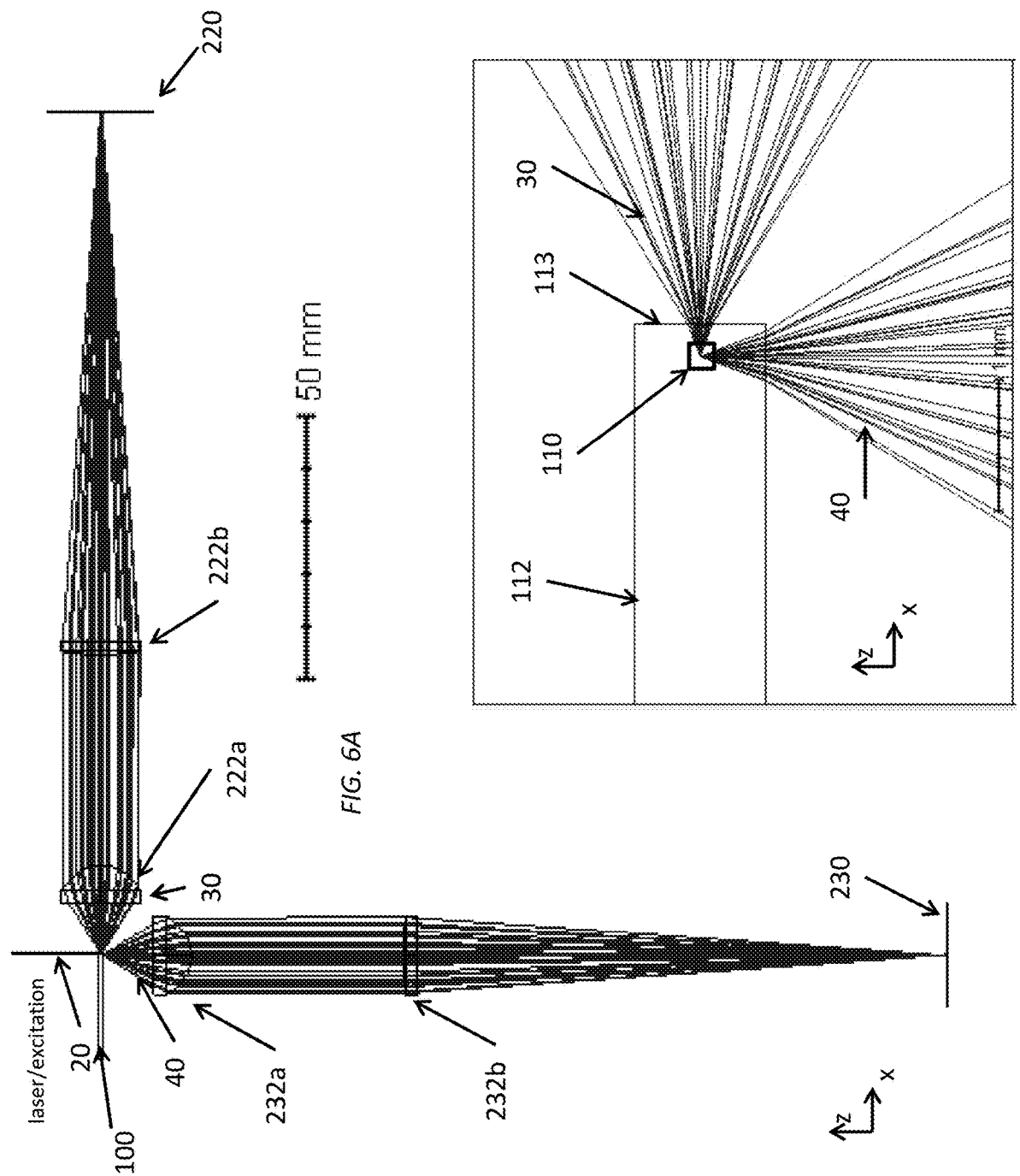

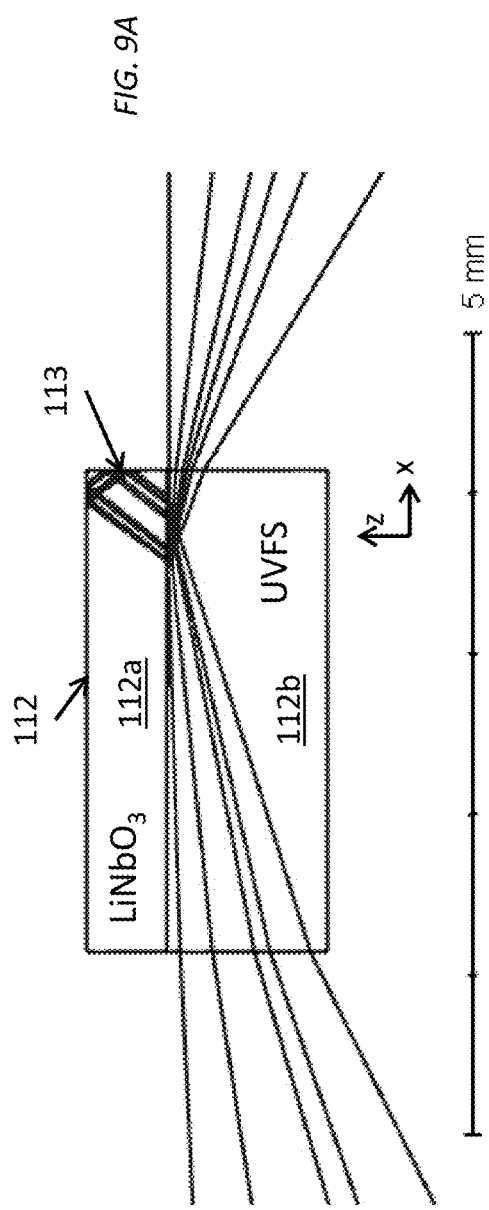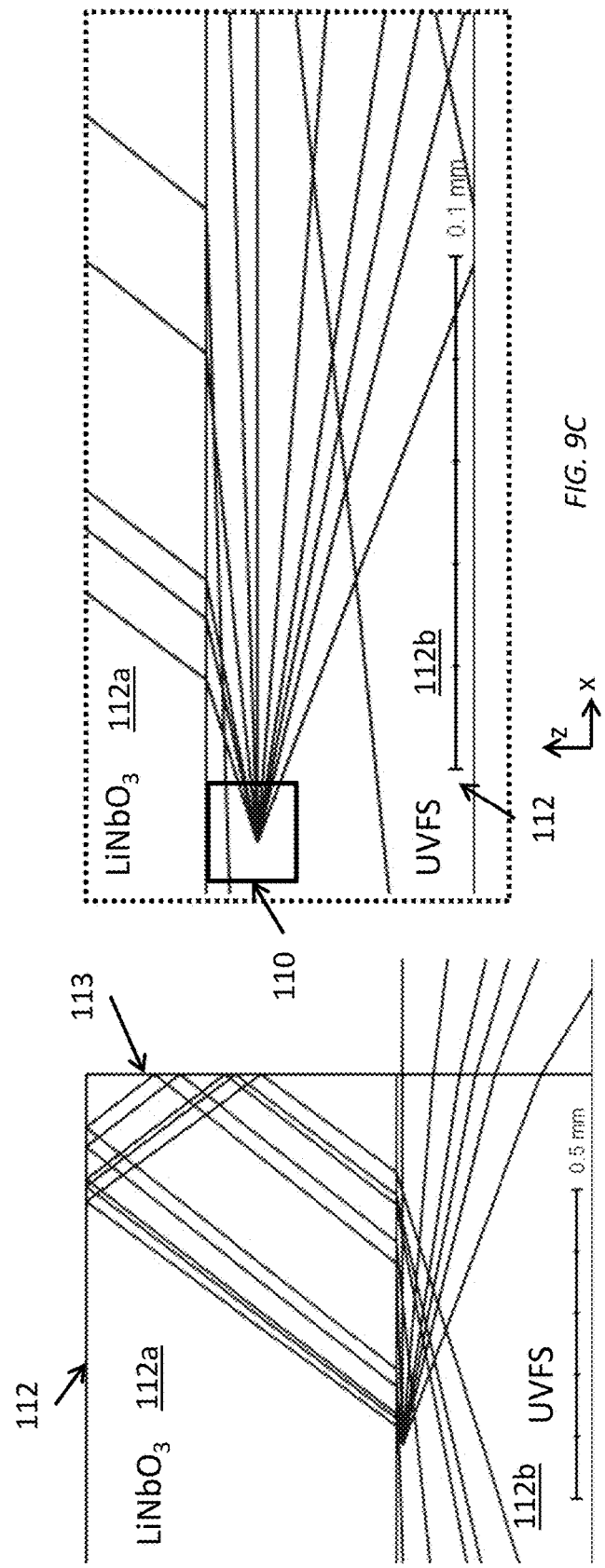

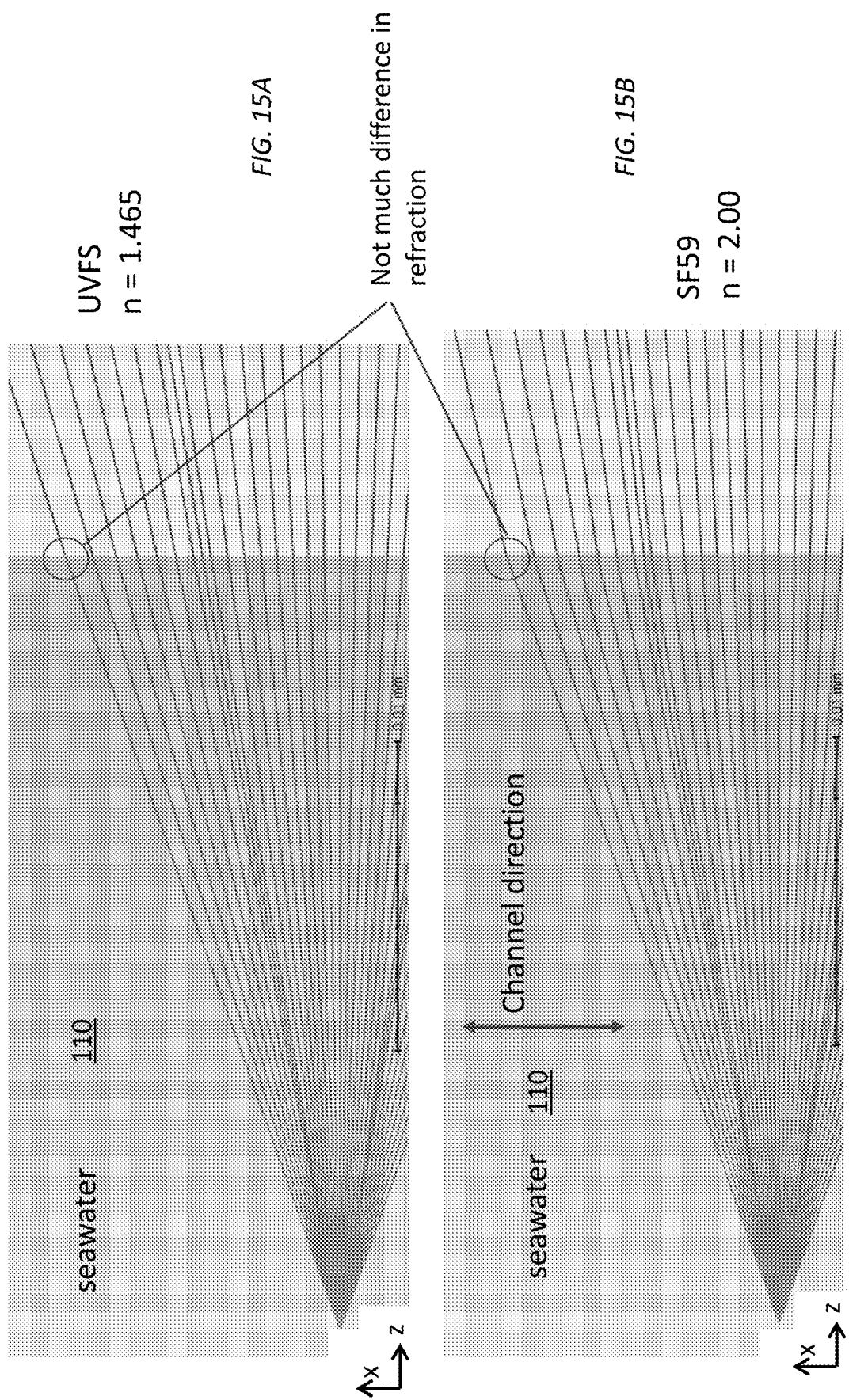

EDGE CHIP

RELATED APPLICATIONS

The present application claims priority to U.S. Provisional Application Ser. No. 62/899,469, filed Sep. 12, 2019, the entire contents of the application are herein incorporated by reference.

BACKGROUND

Flow cytometers transport one or more particles past a detection region. An electromagnetic radiation source illuminates the particle or particles. Detectors in the detection region receive light emitted by or reflected from the particle or particles to monitor or identify properties or characteristics of the particle or particles. Depending upon the property or characteristic to be measured, the detectors may be placed at an angle with respect to an axis of the illumination light.

SUMMARY

A particle processing system is provided in accordance with some embodiments taught herein. The particle processing system includes a particle processing chip. The particle processing chip includes a substrate having a plurality of side surfaces, a top surface, and a bottom surface. The plurality of side surfaces defines a thickness of the substrate, and the top surface and the bottom surface define a width and a length of the substrate. The particle processing chip includes a microfluidic channel disposed in the substrate parallel to a first side surface of the plurality of side surfaces and located in the substrate relative to the first side surface to allow a maximal half-angle for a ray of light passing from a center of the microfluidic channel through the first side surface of between 25 degrees and 90 degrees. The particle processing system also includes an electromagnetic radiation source to illuminate an interrogation region in the microfluidic channel through the bottom surface or the top surface of the substrate. The particle processing system also includes a first detector to receive light from the microfluidic channel emitted through the top surface or the bottom surface of the substrate that is opposed to the electromagnetic radiation source. The particle processing system also includes a second detector to receive light from the microfluidic channel emitted through the first side surface of the substrate.

A particle processing chip is provided in accordance with some embodiments taught herein. The particle processing chip includes a substrate having a plurality of side surfaces, a top surface, and a bottom surface. The plurality of side surfaces defines a thickness of the substrate and the top surface and the bottom surface define a width and a length of the substrate. The particle processing chip also includes a microfluidic channel disposed in the substrate parallel to a first side surface of the plurality of side surfaces and located in the substrate relative to the first side surface to allow a maximal half-angle for a ray of light passing from a center of the microfluidic channel through the first side surface of between 25 degrees and 90 degrees.

A particle processing chip is provided in accordance with some embodiments taught herein. The particle processing chip includes a substrate including a plurality of side surfaces defining a thickness of the substrate and a top surface and a bottom surface defining a width and a length of the substrate. The particle processing chip also includes a channel region extending from and parallel to a first side surface of the plurality of side surfaces of the substrate. The channel region has an interrogation region of a microfluidic channel disposed in the substrate such that at least the interrogation region of the microfluidic channel is located in the channel region such that a particle in the interrogation region emits or scatters a sufficient amount of light through the first side surface to allow characterization of the particle.

BRIEF DESCRIPTION OF THE DRAWINGS

The skilled artisan will understand that the drawings are primarily for illustrative purposes and are not intended to limit the scope of the subject matter taught herein. The drawings are not necessarily to scale; in some instances, various aspects of the subject matter disclosed herein may be exaggerated or enlarged in the drawings to facilitate an understanding of different features. In the drawings, like reference characters generally refer to like features (e.g., functionally similar or structurally similar elements).

The foregoing and other features and advantages provided by the present disclosure will be more fully understood from the following description of exemplary embodiments when read together with the accompanying drawings, in which:

FIGS. 1A and 1B illustrate top and end views, respectively, of a conventional particle processing chip.

FIG. 1C illustrates an end view of a conventional particle processing chip having a beveled edge.

FIG. 5A illustrates an end view of an optical simulation for a conventional particle processing chip, for example, the conventional particle processing chips of FIGS. 1A-1C.

FIG. 5B illustrates a zoomed in view of FIG. 5A.

FIGS. 5C-5E illustrate additional views of the particle processing chip of FIG. 5A.

FIG. 6A illustrates an end view of an optical simulation for an embodiment of a particle processing chip in accordance with the present disclosure.

FIG. 6B illustrates a zoomed in view of FIG. 6A.

FIG. 9A illustrates an optical simulation of a particle processing chip as taught herein having first and second layers made of different materials in accordance with various embodiments of the present disclosure.

FIGS. 9B and 9C illustrate progressively greater magnifications of the same simulation as illustrated in FIG. 9A centered in the vicinity of the microfluidic channel.

FIGS. 15A and 15B illustrate ray-trace simulations of longitudinal refraction for rays exiting a microfluidic channel and entering a substrate in accordance with various embodiments taught herein.

DETAILED DESCRIPTION

Figure 2A:
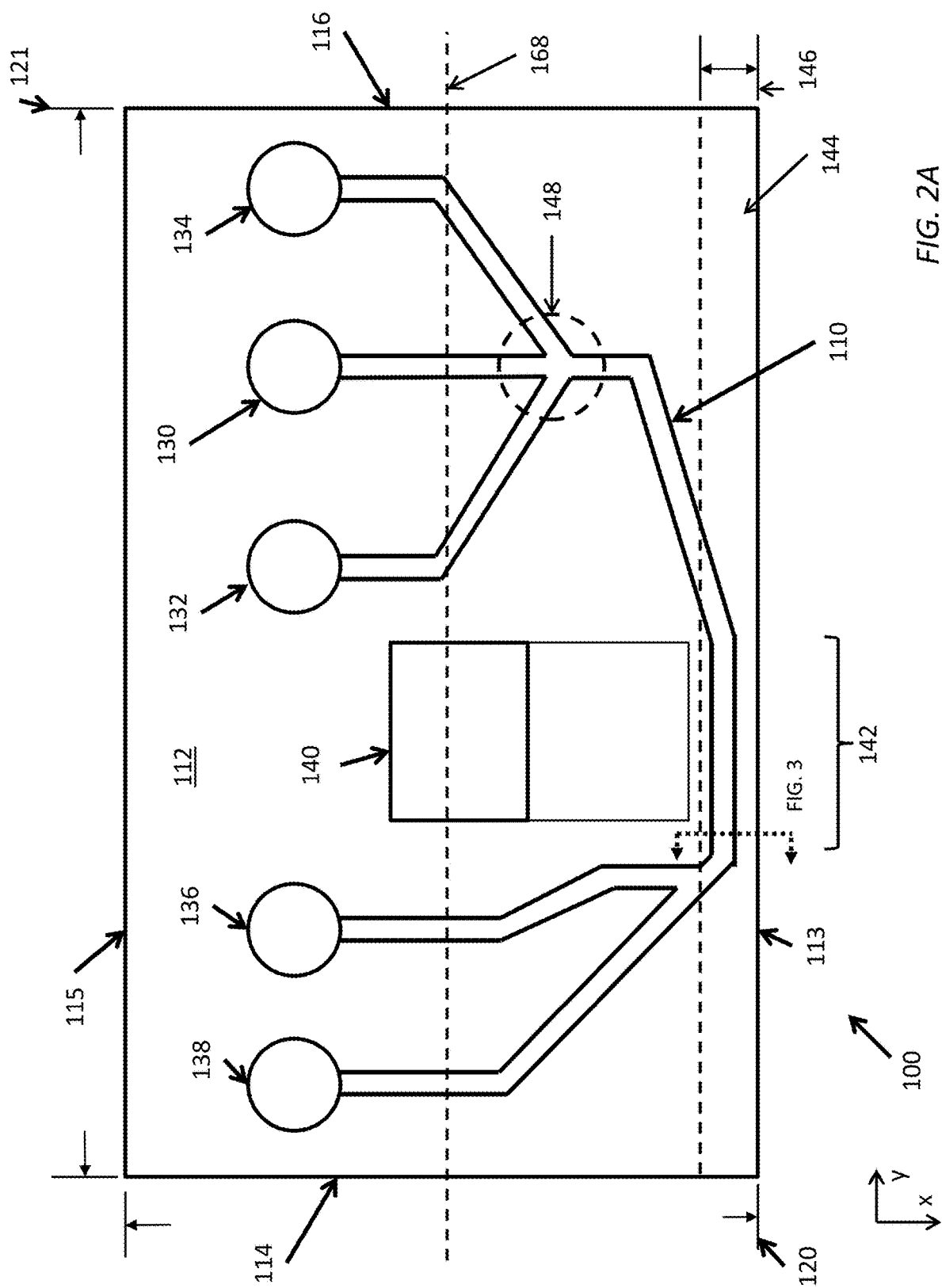
FIGS. 2A and 2B illustrate a top view and a perspective view, respectively, of a particle processing chip in accordance with embodiments of the present disclosure.

Systems and methods taught herein address problems associated with attempting simultaneous detection of generally forward-directed (i.e., 0°) and generally side-directed (i.e., 90°) light originating within a microfluidic channel disposed in a thin substrate. In conventional devices, the microfluidic channel is disposed away from side surfaces and toward the center of the substrate. For thin substrates (for example, substrates having a thickness between about 250 microns and 2 millimeters), light traveling from the central microfluidic channel to a side surface of the substrate is either confined to a very narrow range of angles or undergoes multiple internal reflections owing to fact that the distance to the side surface is much greater than the substrate thickness, which increases the path length and results in some absorption or loss of light at each reflection. As a result, the light cone of direct rays and the multiple reflections of other rays significantly reduce the amount of light that passes through side surfaces of the substrate where it can be detected with a detector.

In systems of the present disclosure, a portion of the microfluidic channel is located parallel and in close proximity to a first side surface of the substrate to enable simultaneous detection paths with respect to forward (i.e., 0°) and side (i.e., 90°) detection. That is, the location of an interrogation or observation portion of a microfluidic channel, as taught herein, enables a maximal half-angle for a ray of light passing from a center of the microfluidic channel through the first side surface of the substrate to be in a range from 25 to 90 degrees. By disposing at least a portion of the microfluidic channel (for example, an interrogation region of the microfluidic channel) proximate to the side surface of the substrate, a significantly greater proportion of light emitted from within the microfluidic channel can be collected and imaged on a detector as compared to conventional planar particle processing apparatus, which is also referred to in this disclosure as particle processing chip(s).

The arrangement of the microfluidic channel within particle processing chips of the present disclosure enables use of these chips with an orthogonal flow cytometry imaging system. In other words, placement of the interrogation region of the microfluidic channel proximate to a side surface of the chip enables illumination of the microfluidic channel along a first axis perpendicular to a top or bottom surface of the substrate and simultaneous detection of light along the first axis and along a second axis that is orthogonal to both the first axis and to the side surface of the chip. The ability to use particle processing chips in an orthogonal flow cytometry imaging system facilitates direct comparison of results acquired from this chip and results acquired from other cytometry instrument designs such as jet-in-air or capillary flow devices. As used herein, the terms "particle" or "particles" include, but are not limited to, cells (e.g., blood platelets, white blood cells, tumorous cells, embryonic cells, spermatozoa, etc.), organelles, and multi-cellular organisms. Particles may include liposomes, proteoliposomes, yeast, bacteria, viruses, pollens, algae, or the like. Additionally, particles may include genetic material, RNA, DNA, fragments, proteins, etc. Particles may also refer to non-biological particles. For example, particles may include metals, minerals, polymeric substances, glasses, ceramics, composites, or the like. Particles may also refer to synthetic beads (e.g., polystyrene), for example, beads provided with fluorochrome conjugated antibodies.

As taught herein, a "channel" refers to a pathway formed in or through a medium or substrate that allows for movement of fluids, such as liquids and gases. The term "microfluidic" as applied to "channel" refers to a channel, preferably formed in a microfluidic system or device, having cross-sectional dimensions in a range between about 1.0 μm and about 2000 μm. In some embodiments, the microfluidic channel has cross-sectional dimensions in a range between about 25 μm and about 500 μm. In some embodiments, the microfluidic channel has cross-sectional dimensions in a range between about 35 μm and about 300 μm. One of ordinary skill in the art will be able to determine an appropriate volume and length of the microfluidic channel for a desired cytometry application. The ranges above are intended to include the above-recited values as upper or lower limits. In general, a microfluidic channel may have any selected cross-sectional shape, for example, U-shaped, D-shaped, rectangular, triangular, elliptical/oval, circular, square, trapezoidal, etc. cross-sectional geometries. The geometry may be constant or may vary along the length of the microfluidic channel. Further, a microfluidic channel may have any selected arrangement or configuration, including linear, non-linear, merging, branching, tapering, ramped, looped, twisting, stepped, etc. configurations. A microfluidic system or device, for example, a microfluidic chip, may include any suitable number of microfluidic channels for transporting fluids. In some applications, a microfluidic chip may be provided as part of a disposable cartridge for removable engagement with a microfluidic instrument. Further, a microfluidic chip may be provided as part of a disposable cartridge, wherein the disposable cartridge is a completely enclosed and sealed or sealable fluidic channel system.

As taught herein, "upstream" is a relative direction or location on a device that is earlier in the flow path as measured by the direction of fluid flow in one or more of the channels. As taught herein, "downstream" is a relative direction or location on a device that is later in the flow path as measured by the direction of fluid flow in one or more of the channels.

As taught herein, a "surface" such as a side surface, top surface, or bottom surface indicates the outermost surface at the relevant location including any coatings or other layers that may be associated with a bulk or substrate object. For example, an antireflection coating disposed on a side of a glass substrate would be the outermost surface and would constitute the "side surface" as taught herein.

Conventional flow cytometers such as jet-in-air systems employ excitation light and multi-angle detection of light that interacts with a particle traveling in a fluid flow within a stream of liquid. Particle characteristics such as particle size often are measured along the axis of illumination (i.e., at an angle of 0° with respect to the illumination axis) using optical properties such as light scatter or light extinction or both. Particle characteristics such as light scatter, or fluorescence intensity, or both often are measured in a direction away from the axis of the illumination light (e.g., at an angle of 90° with respect to the illumination axis). Such an arrangement in a jet-in-air system is simplified by the fact that the fluid stream to be analyzed is open to the air and is not contained within a vessel that physically obstructs the presence of imaging optics. Often, illumination of a particle from a source of electromagnetic radiation occurs from a first direction (0°) where forward light scatter is measured in a forward direction (e.g., 0°±10-20°) and side scatter, fluorescence, or both are measured along an axis generally 90° (±30° or more or less) from the illumination direction.

Unfortunately, the use of a microfluidic chip with a microfluidic channel formed in a central portion thereof in a conventional optical arrangement-based flow cytometer encounters a number of difficulties. The central location of the microfluidic channel in the chip (substrate) limits the ability to reliably and accurately measure simultaneous detection paths with respect to forward (i.e., 0°) and side (i.e., 90°) detection. That is, the location of an interrogation or observation portion of the microfluidic channel centrally located in the chip does not allow a maximal half-angle for a ray of light passing from a center of the microfluidic channel through an outermost side surface of the substrate to be in a range from 25 to 90 degrees. For example, the numerical aperture for light collection through the edge of the conventional flat chip with the microfluidic channel located away from a side surface (for example, near or at a center of the substrate) is impeded by the geometry because the distance of the microfluidic channel from the edge and the thickness of the chip limits the angle over which emitted light can escape the chip without undergoing multiple reflections and thereby increasing the path length. Moreover, illumination is highly restricted because of the planar geometry and materials used in that illumination of the microfluidic channel through any surface other than the top or bottom surface introduces optical aberrations or scattering which reduces the amount of light available to illuminate the channel. For example, in some existing embodiments light may pass through two or more materials having different refractive indices which can result in a non-preferred beam shape or a resulting beam that is split or misshapen in a non-preferred manner. As a result of these difficulties, simultaneous detection along 0° and 90° detection paths with respect to excitation (at 0°) is rendered difficult in conventional planar substrates.

The particle processing chips taught herein enable illumination of the microfluidic channel at a large numerical aperture along the illumination light path and simultaneous collection of light from the microfluidic channel at large numerical apertures along both the forward-directed (0°) and side-directed (90°) light paths by positioning the interrogation region of the microfluidic channel near a particular side surface of the chip. As taught herein, an advantage of the an exemplary particle processing chip is the path length of the illumination light path as well as the forward-directed (0°) and side-directed (90°) light paths avoids unnecessary absorption of light.

FIGS. 1A and 1B illustrate top and end views, respectively, of a conventional particle processing chip with light excitation offset from perpendicular to the bottom surface and associated non-orthogonal optical paths that enable detection of light along a forward-directed path and along a side-directed path. The conventional particle processing chip 10A includes a substrate 12A and a microfluidic channel 110A in the substrate 12. The microfluidic channel 110A is in fluidic communication with a sample inlet 130A, two sheath fluid inlets 132A, 134A and two outlets 136A, 138A. The microfluidic channel 110A includes an interrogation region 142A where a particle flowing in flow stream within the microfluidic channel 110A is interrogated. A chamber 140A that is operably coupled to an actuator can selectively change the position of an individual particle in a fluid stream in the microfluidic channel 110A.

In the conventional arrangement, the interrogation region 142A of the microfluidic channel 110A lies on or near a center longitudinal axis 168A that divides the substrate 12A into two halves. As a result, the interrogation region 142A of the microfluidic channel 110A is placed a large distance (e.g., several millimeters or more) from the edges of the chip 10A. The interrogation region 142A of the microfluidic channel 110A is often placed on or near the center longitudinal axis 168A to allow for symmetric construction of the conventional particle processing chip 10A. In addition, fluid flow in the microfluidic channel 110A can occur under high pressures. It has long been felt that it was necessary to place the microfluidic channel 110A away from side surfaces or edges of the chip to avoid fluid leakage from the microfluidic channel 110A to the edges of the chip 10A.

As shown in FIG. 1B, a particle 101 flows within the channel 110A. While the top view of FIG. 1A shows the path that a particle would take in the microfluidic channel from inlet to outlet, the end view provided in FIG. 1B illustrates the end of the microfluidic channel 110A such that the direction of flow in the channel is directed out of the page (i.e., in the −y direction). The conventional particle processing chip 10A is not suitable for illumination in an orthogonal flow cytometer imaging setup. Because the interrogation region 142A of the microfluidic channel 110A is positioned at or near the center longitudinal axis 168A, light emitted or scattered from a particle in the microfluidic channel 110A must travel a long path distance through the substrate 12A before reaching a side surface. On this long path through the substrate 12A, the light can be reflected multiple times, refracted, or absorbed at substrate-air interfaces. As a result, imaging of particles in the microfluidic channel 110A through side surfaces is poor in a conventional particle processing chip 10A as a significant proportion of light is lost and any light that does escape can be poorly focused at best. More information related to the difficulties in gathering light from the side surface is provided below with respect to optical modeling simulations in FIGS. 5A-5D. Thus, several strategies are used conventionally to enable forward and side imaging in conventional particle processing chips.

In FIG. 1B, the microfluidic channel 110A of the conventional particle processing chip 10A is illuminated at an oblique angle from below through a bottom surface 118A of the conventional particle processing chip 10A along the illumination light path 20A. Emitted or scattered light or light that otherwise interacts with the particle 101 is then detected along the forward-directed light path 40A and the side-directed light path 30A. Drawbacks of this arrangement of the light paths include loss of illumination light as the light passes into the substrate 12A at an angle rather than perpendicular to the bottom surface 118A and loss of scattered or emitted light as the light passes out of the substrate 12A at an angle rather than perpendicular to a top surface 117A.

In FIG. 1C, a different conventional particle processing chip 10B is illustrated that includes a beveled edge 14. The illumination light path 20B enters the substrate 12B from above through a top surface 117B, and scattered or emitted light from the particle 101 exits the substrate 12B through a bottom surface 118B of the substrate 12B along the forward-directed light path. The side-directed light path 30B passes sideways through the substrate 12B before being reflected at the beveled edge 14 and finally passing through the bottom surface 118B of the substrate 12B. Drawbacks of this arrangement can include loss of light from the side-directed light path 30B through the bottom surface 118B and a top surface 117B of the conventional microfluidic particle processing chip 10B while the light traverses the substrate 12B and while the angle of this light is also subtended. In other words, a significant proportion of the side-directed light exits the chip 10B well before reaching the angled portion 14 and is thus lost without being detected at a detector.

Figure 2B:
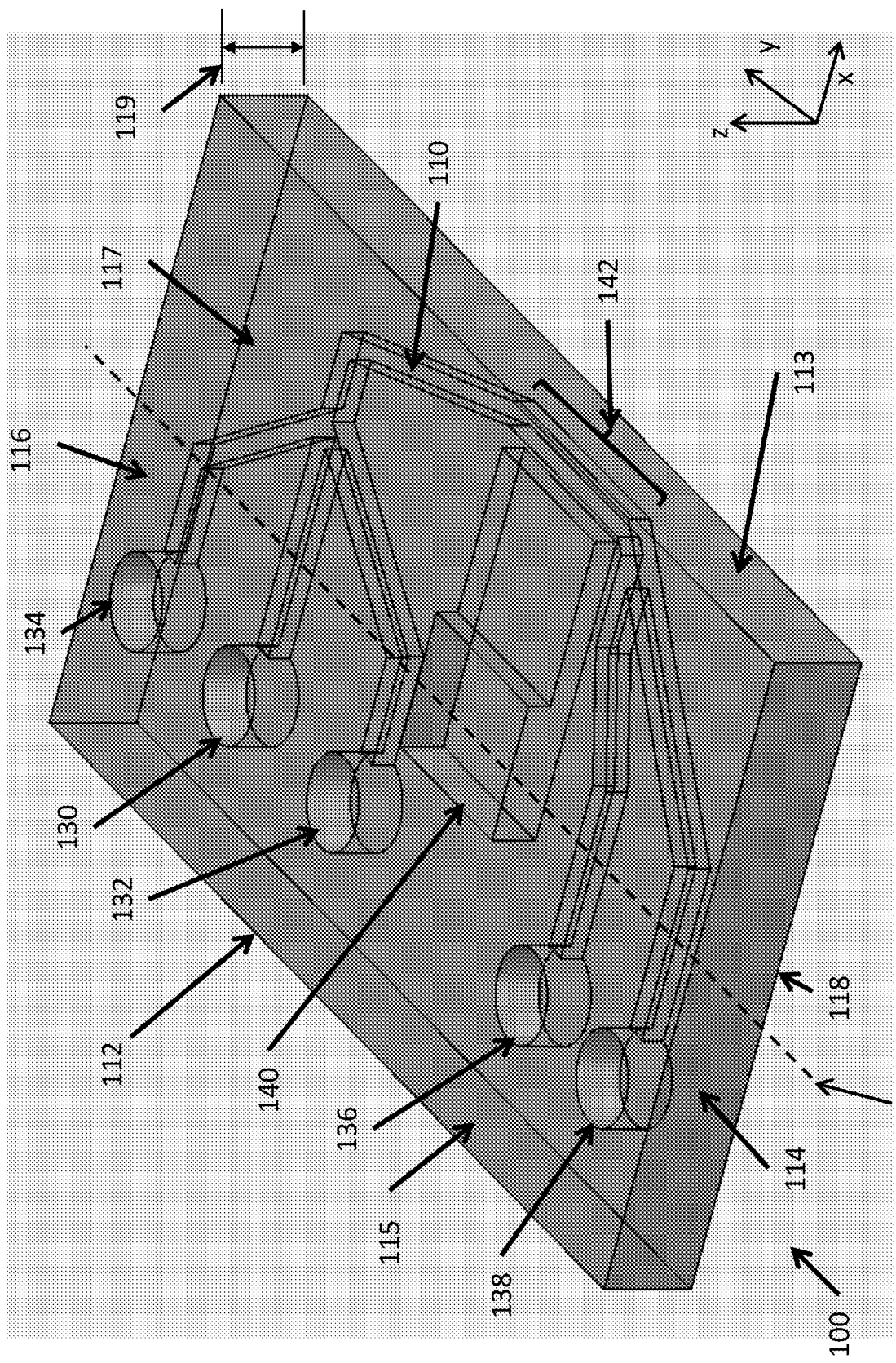

FIGS. 2A and 2B illustrate top and perspective views, respectively, of a particle processing chip 100 in accordance with various embodiments taught herein. The particle processing chip 100 includes a substrate 112 and a microfluidic channel 110 disposed in the substrate 112. The substrate 112 can have side surfaces 113, 114, 115, 116, a top surface 117, and a bottom surface 118. The side surfaces 113, 114, 115, 116 define a thickness 119 of the substrate. The top surface 117 and the bottom surface 118 define a width 120 and a length 121 of the substrate 112. The particle processing chip 100 can include, but is not limited to, a sample inlet 130, sheath inlet inlets 132, 134, and outlets 136, 128 in fluid communication with the microfluidic channel 110. The sheath inlets 132, 134 and sample inlet 130 can join the microfluidic channel 110 in a hydrodynamic focusing region 148. An interrogation region 142 of the microfluidic channel 110 lies in a channel region 144 having a width 146. The substrate 112 can include a chamber 140 operably couplable to an actuator to selectively change the position of one or more particles 101 in a fluid stream within the microfluidic channel 110. The substrate 112 defines a center longitudinal axis 168 that divides the substrate 112 into halves. For example, opposing side surfaces 113 and 115 can be used to define the center longitudinal axis 168.

Figure 3:
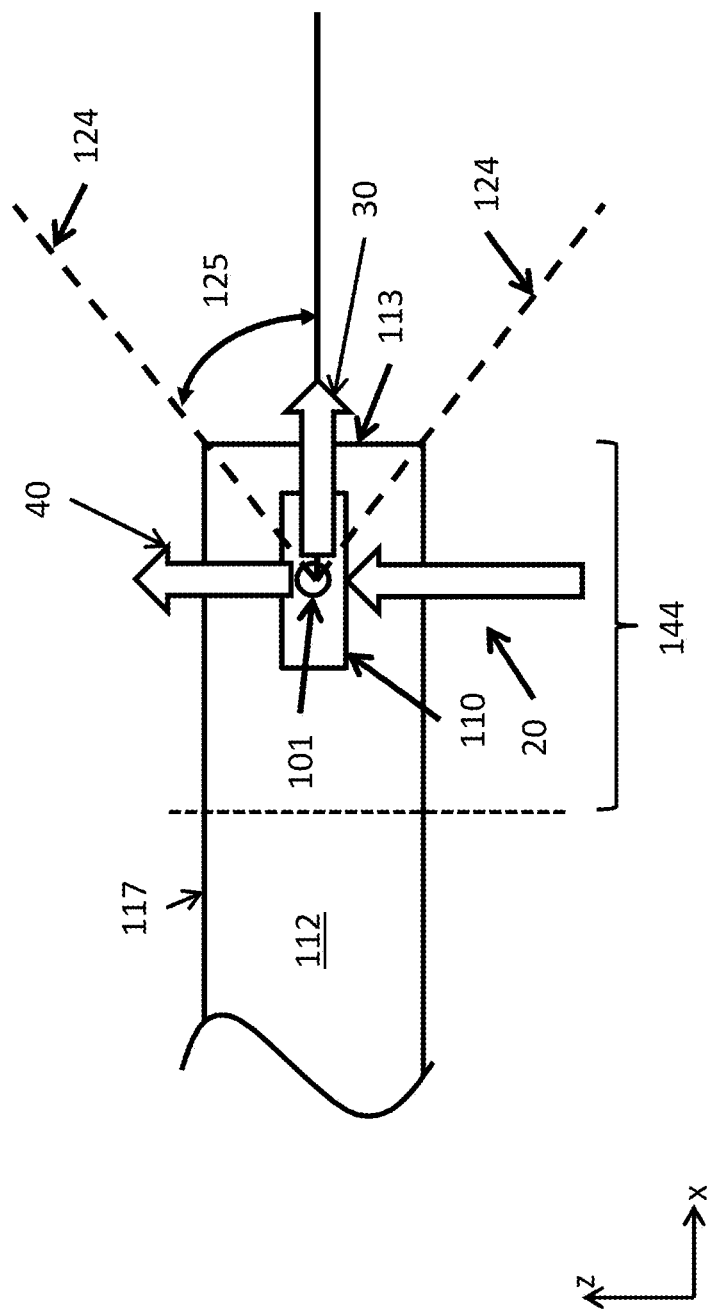
FIG. 3 illustrates an end view of the particle processing chip in accordance with certain embodiments of the present disclosure.

The microfluidic channel 110 is disposed in the substrate 112 near the side surface 113 of the substrate 112 to allow light emitted, or scattered, or both from within the microfluidic channel 110 to pass out of the side surface 113 of the substrate without experiencing absorption, or attenuation, or multiple lossy reflections or all three, from surfaces of the substrate 112. In other words, the position of the microfluidic channel 110 in the channel region 144 proximate to the side surface 113 enables light rays originating from within the microfluidic channel 110 to pass through the side surface 113 over a large range of exit angles and be successfully captured by a detector or imaging optics. In some embodiments, the thickness 119 of the substrate 112 is in a range from 250 micrometers to 2 millimeters. Positioning the channel region 144 proximate to the side surface 113 in such a thin substrate improves outcoupling of light. To facilitate description of an exemplary embodiment, the microfluidic channel 110 will be discussed as being proximate to the side surface 113. Nonetheless, in other embodiments as taught herein, the microfluidic channel 110 can be associated with and proximate to other side surfaces 114, 115, and 116. The particle processing chip 100 of FIG. 3 provides improved signal levels along the side-directed light path 30 and, in some cases, comparably low levels of signal loss along the side-directed light path 30 and the forward-directed light path 40.

Advantageously, the arrangement of the interrogation region 142 in the channel region 144 enables simultaneous detection of light along the side-directed light path 30 perpendicular to the side surface 113 and light along the forward-directed light path 40 perpendicular to the top surface 117. Simultaneous detection is important for many applications, for example, analysis and sorting of sperm cells. Because sperm cells are "flat," their excitation and detection are important with respect to the device and associated optical system within which they are to be measured. Conventionally, simultaneous detection of light through the top surface and the side surface of a particle processing chip has been counter-indicated because a limited number of difficult-to-focus photons are able to escape the side surface of the conventional chip having the microfluidic channel located away from the side surfaces.

As taught in greater detail below with respect to FIG. 4, optical elements such as focusing, beam-shaping, or light collection elements can receive light originating from the particle 101 in the microfluidic channel 110 along the side-directed light path 30 and the forward-directed light path 40. The numerical aperture of an optical element is an important indicator of the amount of light that can be gathered by the optical element and can be viewed in terms of the maximal angle that a light ray can take to travel from the point to be imaged (i.e., the particle 101) and the optical element. For imaging of conventional particle processing chips having a microfluidic channel at the center of the chip, the numerical aperture for imaging the particle in the channel is sharply reduced from the lens' theoretical value because of the narrow range of angles that can pass through the side surface. In embodiments of the present invention, the location of the interrogation region 142 of the microfluidic channel 110 in the channel region 144 can enable a ratio of a side numerical aperture measured from a central portion of the microfluidic channel 110 through the first side surface 113 and a forward numerical aperture measured from the central portion of the microfluidic channel 110 through the top surface 117 or the bottom surface 118 that is in a range from 1:2 to 1:1.

In some embodiments, the illumination light path 20 can enter the microfluidic chip through the side surface 115, 113 to produce a transverse excitation beam. In some embodiments, the locations of the side-directed light path 30 and the forward-directed light path 40 are swapped. Thus, a transverse excitation beam (e.g., illumination light path 20 passing through and perpendicular to the side surface 115)

produces a side-directed light path 30 that passes through and is perpendicular to the top surface 117 or the bottom surface 118 of the substrate 12 while the forward-directed light path 40 passes through and is perpendicular to the side surface 113.

Figure 13:
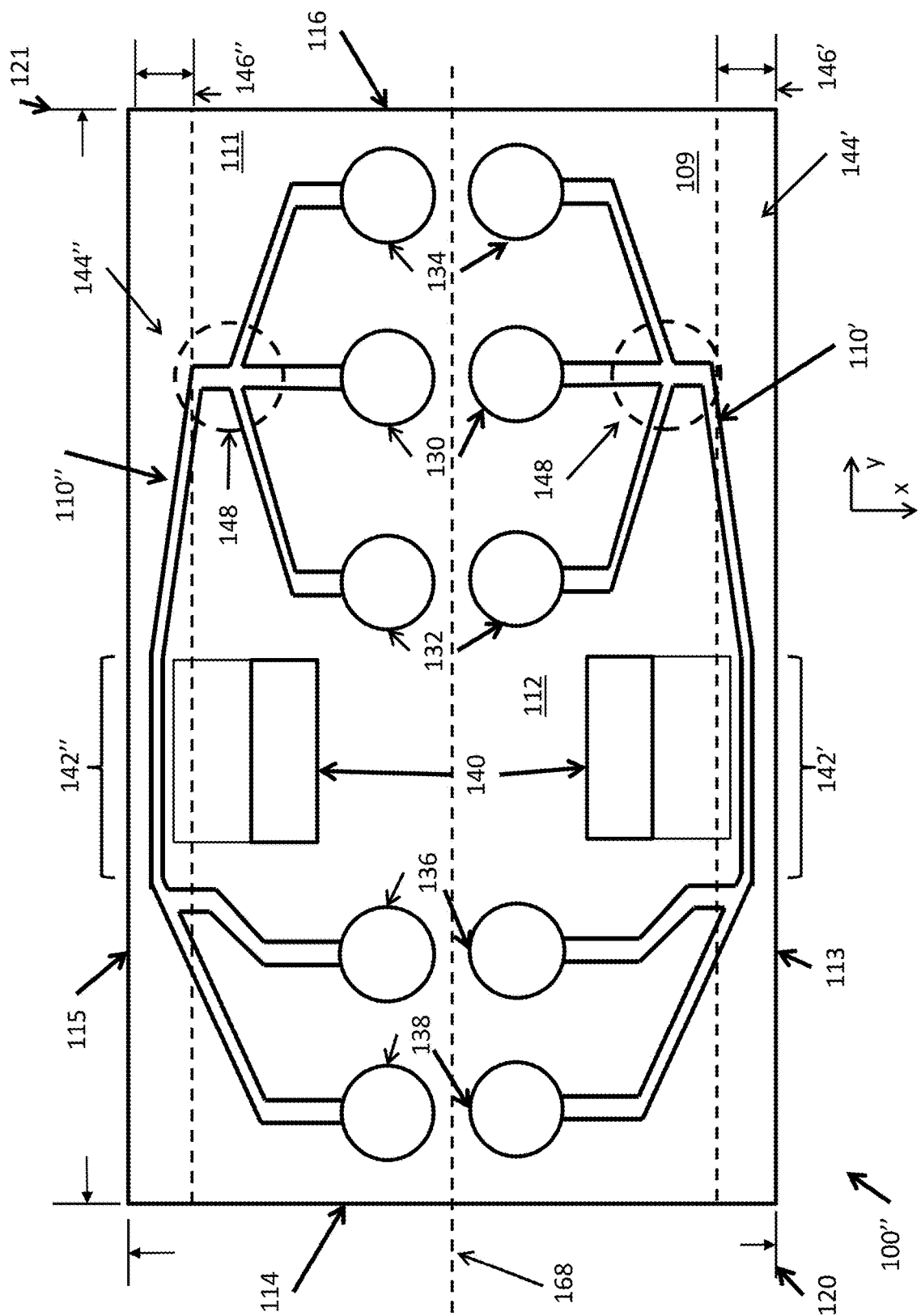
FIG. 13 illustrates a top view of an exemplary particle processing chip including multiple microfluidic channels in accordance with various embodiments of the present disclosure.

In some embodiments, the particle processing chip 100 can have just a single microfluidic channel 110 disposed within the substrate 112. In some embodiments, two or more microfluidic channels 110 can be disposed parallel to different side surfaces of the substrate 112 as illustrated in FIG. 13. In some embodiments, some or all of the two or more microfluidic channels 110 can be disposed parallel to the same side surface at different locations on the side surface. In some embodiments, the two or more microfluidic channels may be arranged in a radial pattern, a 2D or 3D matrix, or any other regularized or random pattern in two or three dimensions.

Although the substrate 112 is depicted as having a cuboid shape, it is contemplated that the substrate 112 could have other three-dimensional shapes involving a greater or lesser number of surfaces than depicted in FIG. 2A. For example, the substrate 112 could have one or more beveled edges, angled edges, or rounded, spherical, or aspherical surfaces or edges that define a greater or lesser number of surfaces. As taught in greater detail below with respect to FIG. 8, the substrate 112 of some embodiments taught herein can be formed of a first layer 112a and a second layer 112b that are physically coupled (e.g., bonded) together.

Figure 12:
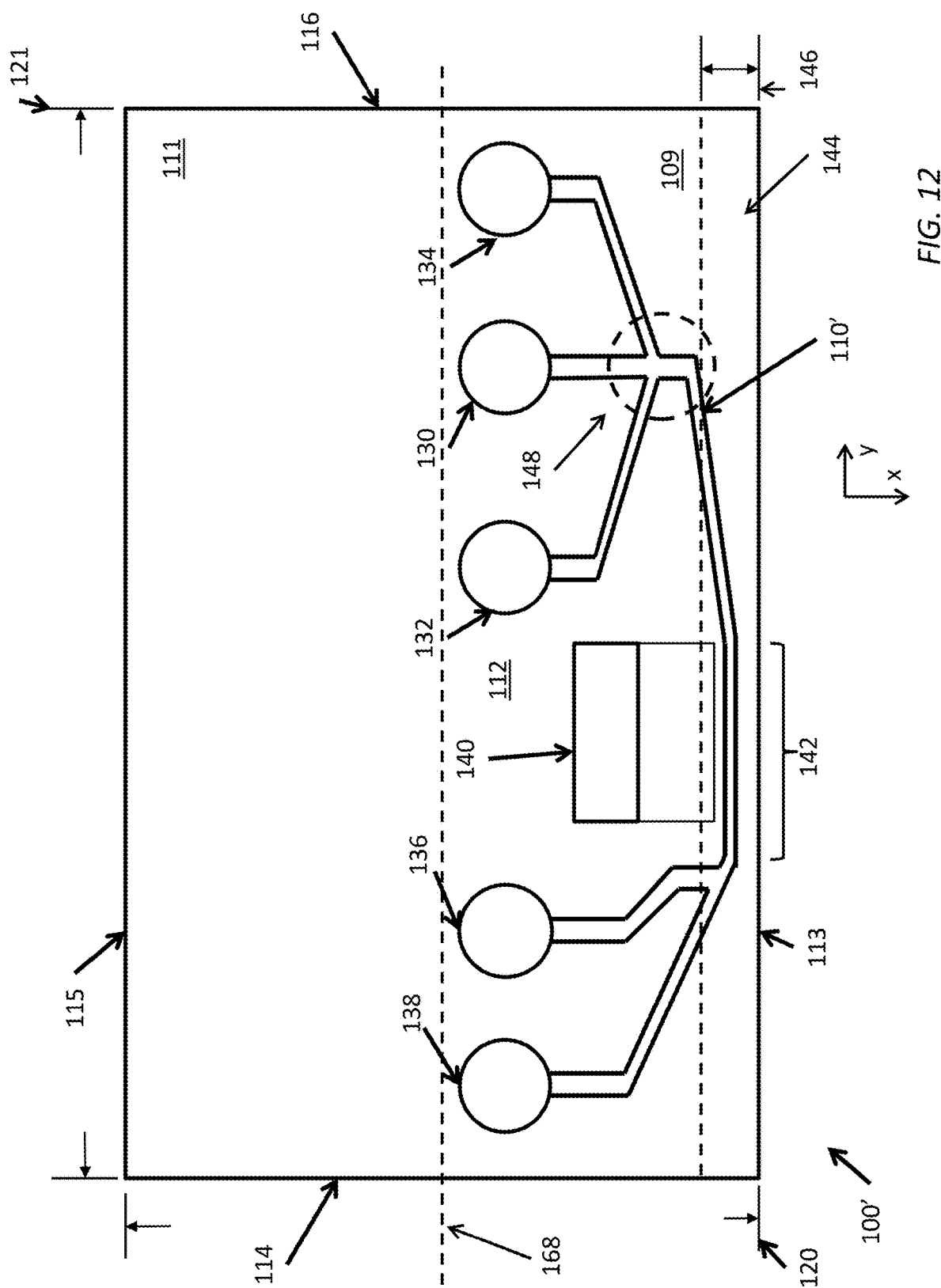
FIG. 12 illustrates a top view of an exemplary particle processing chip including an exemplary arrangement of a microfluidic channel in accordance with various embodiments of the present disclosure.

Referring to FIGS. 2A, 2B, and 12, the particle processing chip 100 includes the channel region 144 extending parallel to the first side surface 113. Those skilled in the art will appreciate that the channel region 144 may be associated with one of the side surfaces 114, 115, or 116. To facilitate explanation of the inventions disclosed herein, the channel region 144 is discussed in relation to the side surface 113. The channel region 144 has a width 146. In exemplary embodiments, the channel region 144 abuts the first side surface 113. At least the interrogation region 142 of the microfluidic channel 110 located in the channel region 144 such that a particle 101 in the microfluidic channel 110 emits or scatters a sufficient amount of light through the first side surface 113 to allow characterization of the particle 101. In some embodiments, the width 146 of the channel region 144 is less than 2 mm, less than 1 mm, less than 0.5 mm, less than 0.25 mm, or any other suitable size. In some embodiments, the interrogation region 142 of the microfluidic channel 110 located in the channel region 114 is parallel to the first side surface 113 of the substrate 112.

The sample inlet 130 can be in fluid communication with the microfluidic channel 110. The sample inlet 130 can be used to introduce a sample stream into the microfluidic channel 110 for processing. Although a single sample inlet 130 is depicted in FIGS. 2A and 2B, it is contemplated that multiple sample inlets 130 could be provided on the substrate 112. For example, sample streams from multiple sample inlets 130 could merge together into the microfluidic channel 110 at a same position along the microfluidic channel 110 or at different positions along the length of the microfluidic channel 110.

One or more sheath fluid inlets 132, 134 are in fluid communication with the microfluidic channel 110. The sheath inlets 132, 134 and sample inlet 130 can join the microfluidic channel 110 in a hydrodynamic focusing region 148. The sheath fluid inlets 132, 134 can introduce sheath fluid (also referred to as focusing fluid) into the microfluidic channel to focus the sample stream. In some embodiments, fluid from the first sheath fluid inlet 132 can enter the microfluidic channel 110 in an opposing direction relative to fluid entering the microfluidic channel 110 from the second sheath fluid inlet 134. Fluid from the first sheath fluid inlet 132 and fluid from the second sheath fluid inlet 134 can merge with the microfluidic channel 110 at a same position along the microfluidic channel 110 in some embodiments. In other embodiments, fluid from the first sheath fluid inlet 132 can merge with the microfluidic channel upstream of fluid from the second sheath fluid inlet 134 or vice versa. In some embodiments, the hydrodynamic focusing region 148 can include two or more separate sub-regions (e.g., a primary focusing region and a secondary focusing region) that are each associated with distinct locations where fluid from the first sheath fluid inlet 132, sample inlet 130, and second sheath fluid inlet 134 are first in fluidic communication with the microfluidic channel 110.

The particle processing chip 100 can be used for interrogation and processing of one or more particles entrained in a microfluidic stream within the microfluidic channel 110.

As used herein, "interrogation" refers to detection of light emitted or otherwise scattered from an illuminated particle, or the absence of light due to interaction with a particle, to determine values for one more particle characteristics such as size, shape, form, orientation, fluorescence intensity or wavelength, optical scattering intensity or wavelength, geometry, volume, surface area, ellipticity, refractive index, granularity, porosity, conductivity, identity, type, phenotype, protein or molecular expression, genetic content, live/dead state, velocity, or the like.

As used herein, "processing" a particle refers to taking an action in response to a determination of one or more particle characteristics of the particle including activating an actuator to sort the particle, isolating a particle population, purifying a particle population, or enriching a particle population.

The interrogation region 142 is a location in the microfluidic channel 110 wherein a particle 101 in the microfluidic channel 110 can be interrogated. The interrogation of a particle 101 provides information about one or more particle characteristics, and that information can then be used to aid or enable processing of the particle. In some embodiments, a particle 101 flowing through the interrogation region 142 can be interrogated using light from an electromagnetic radiation source and can emit or scatter light that is detected by detectors. Particle characteristics can be determined from the emitted or scattered light and can enable sorting of the particle. The interrogation region 142 of the microfluidic channel 110 is within the channel region 146 and remains parallel to the side surface 113 although other portions of the microfluidic channel 110 may enter and exit the channel region 146 and be other than parallel relative to the side surface 113. In some embodiments, the interrogation region 142 can include electrical traces that measure electric, magnetic, or physical properties of a particle in the microfluidic channel 110. Additional attributes such as location, velocity, size, orientation, or position provide non-limiting examples of other attributes that may be measured and monitored.

One or more outlets 136, 138 are in fluid communication with the microfluidic channel 110. In some embodiments, the outlets 136, 138 are referred to as first outlet 136 and second outlet 138. The particle processing chip 100 can be used to process one or more particles by sorting the one or more particles to a particular outlet in response to an interrogation and assessment of the particle as taught in greater detail below. For example, the particle processing chip 100 may be used to sort one or more particles with a particular characteristic (e.g., certain optical fluorescence characteristics) to a "keep" outlet while sorting one or more particles without the particular characteristic to a "discard" or "waste" outlet. Each of the first outlet 136 and the second outlet 138 can be associated with either keep or waste functions in various embodiments. In some embodiments, the outlets 136, 138 can include a reservoir to accumulate processed sample before the processed sample is extracted from the particle processing chip 100.

The chamber 140 is operatively couplable to an actuator. For example, the actuator can be mechanically coupled or bonded to the chamber 140 or formed integrally with the chamber 140. In some embodiments, the actuator can be removably coupled to the chamber 140. By designing the actuator and chamber to be separable, a single actuator can be sequentially used with multiple particle processing chips 100.

The actuator can be used to selectively change position of an individual particle in a fluid stream within the microfluidic channel to cause the selected particle or particles to enter the first outlet 136 or the second outlet 138. A control system such as a computing device can control the actuator to shift the position of a selected particle in the fluid stream based upon detected characteristics of the particle in the fluid stream to cause the selected particle to enter the desired outlet 136, 138. For example, the control system can receive data from detectors that is representative of particle characteristics for the particle 101. The control system can process the data to determine whether the particle satisfies certain criteria, for example, presence or absence of a certain particle characteristic or magnitude for a certain particle characteristic being over a threshold. Upon determining that a particle has particle a characteristic or characteristics that satisfy certain criteria, the control system can operate the actuator to selectively shift the position of the particle in the fluid stream to cause the particle to flow into the desired outlet 136, 138.

The actuator can shift or focus, for example, to center a particle in the fluid stream or direct one or more particles in the fluid stream toward or away from a side wall in some embodiments. The actuator can displace one or more particles laterally or vertically within the fluid stream in some embodiments. In various embodiments, the actuator can include one or more piezoelectric devices. The piezoelectric devices can be operatively coupled to a fluid-filled chamber 140 that is in fluidic communication with the microfluidic channel 100 in some embodiments. The fluid-filled chamber 140 can be filed with gas, liquid, or a combination of gas and liquid. In some embodiments, the actuator can include one or more surface wave generators such as surface acoustic wave generators. The surface wave generators can be formed as an array. In some embodiments, the actuator can include interdigitated transducers (IDTs). The actuator can include one or more ultrasonic transducers in some embodiments, wherein the ultrasonic transducers can be formed as an array in some cases. One skilled in the art will recognize that multiple alternative actuation means may be utilized with the present invention, including but not limited to various thermal, mechanical, optical, magnetic, vortex, fluidic, alternative acoustic, transient pulse by other means, electromagnetic, hydrodynamic or biochemical means capable of focusing one or more particles in the fluid stream or displacing one or more particles laterally or vertically within the fluid, or both.

As illustrated in FIG. 3, the location of the interrogation region 142 of the microfluidic channel 110 in the channel region 144 proximate to the side surface 113 enables light rays originating from within the microfluidic channel 110 to pass through the side surface 113 over a large range of exit angles and be successfully captured by a detector or imaging optics while simultaneously rays pass through the top surface 117 over a large range of exit angles and are captured by a detector or imaging optics. The light cone 124 illustrated in FIG. 3 illustrates the large range of angles that light rays originating from a central portion of the channel 110 may have while still passing through a first side surface 113 of the substrate 112. In some embodiments, the maximal half-angle 125 for a ray of light passing from a center of the microfluidic channel 110 through the first side surface 113 can be in an inclusive range between 25 degrees and 90 degrees. In exemplary embodiments, the maximal half-angle 125 for a ray of light passing from a center of the microfluidic channel 110 through the first side surface 113 can be in an inclusive range between 25 degrees and 50 degrees. As illustrated in FIG. 3, the location of the interrogation region 142 of the microfluidic channel 110 in the channel region 144 enables a similar value for maximal half-angle 125 from the particle 101 through the side surface 113 along the side-directed light path 30 as is available from the particle 101 through the top surface 117 along the forward-directed light path 40. In some embodiments, this similar range of angles is what enables the ratio of the side numerical aperture and the forward numerical aperture to lie in a range from 1:2 to 1:1.

Figure 4:
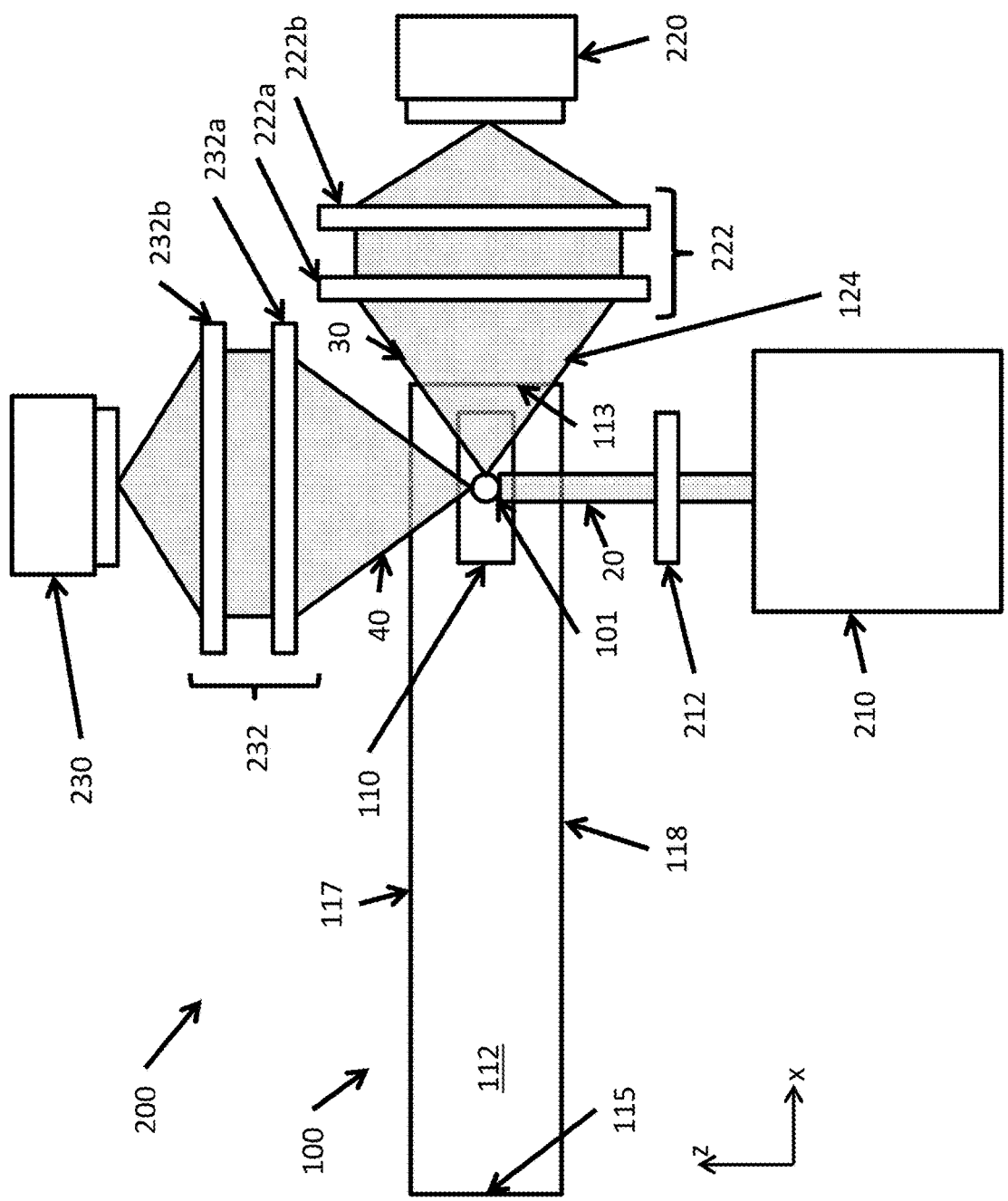
FIG. 4 illustrates an exemplary particle processing system including an exemplary particle processing chip in accordance with some embodiments of the present disclosure.

FIG. 4 illustrates an exemplary particle processing system 200 including the exemplary particle processing chip 100. The particle processing system 200 includes an electromagnetic radiation source 210 located perpendicularly to the bottom surface 118 to illuminate the interrogation region 142 in the microfluidic channel 110. The particle processing system 200 also includes a first detector 230 located perpendicularly relative to the top surface 117 and opposite to and along a common axis with the electromagnetic radiation source 210. The particle processing system 200 also includes a second detector 220 located perpendicularly relative to the side surface 113 and orthogonal to the common axis of the electromagnetic radiation source 210 and the first detector 230. The first detector 230 and the second detector 220 can simultaneously detect light emanating from the particle 101 in the microfluidic channel 110 along the forward directed light path 40 and side-directed light path 30, respectively.

The electromagnetic radiation source 210 illuminates the interrogation region 142 along the illumination light path 20, which is perpendicular to the bottom surface 118. In accordance with some embodiments, the electromagnetic radiation source 210 illuminates the interrogation region 142 through the bottom surface 118 of the substrate 112 of the particle processing chip 100. In FIG. 4, the illumination light path 20 is parallel to the +z direction and perpendicular to the bottom surface 118 of the substrate 112. The first detector 230 receives light from the microfluidic channel 110 emitted, scattered, or otherwise interacted with by a particle through the top surface 117 of the substrate 112 along the forward-directed (0°) light path 40. In FIG. 4, the forward-directed light path 40 is parallel to the +z direction, parallel to the illumination light path 20, and perpendicular to the top surface 117 of the substrate 112. The second detector 220 receives light from the microfluidic channel 110 that is emitted or scattered, or otherwise interacted with by a particle through the first side surface 113 of the substrate 112 along the side-directed (90°) light path 30. In FIG. 4, the side-directed light path 30 is parallel to the +x direction, perpendicular to the illumination light path 20 and the forward-directed light path 40, and perpendicular to the side surface 113.

In some embodiments, the position of the electromagnetic radiation source 210 and the position of the first detector 230 can be swapped such that the electromagnetic radiation source 210 illuminates the interrogation region 142 through the top surface 117 and the first detector 230 receives light from a particle in the microfluidic channel 110 through the bottom surface 118 of the substrate 112. In some embodiments, the first detector 230 can receive light from the surface that is opposed to the electromagnetic radiation source 210, e.g., when the electromagnetic radiation source 210 illuminates through the top surface 117 or bottom surface 118, the first detector 230 can receive through the bottom surface 118 or top surface 117, respectively. In some embodiments, the illumination light path 20 and the forward-directed light path 40 are parallel to a same axis (e.g., the +z axis). For example, the electromagnetic radiation source 210 can illuminate the microfluidic channel 110 along a first axis (e.g., the +z axis) and the first detector 230 can receive light along the first axis. The second detector 220 can receive light along a second axis (e.g., the +x axis) in some embodiments. In an exemplary embodiment, the second axis is orthogonal to the first axis. In other words, the illumination light path 20 and the side-directed light path 30 can lie along orthogonal axes.

The first detector 230 and the second detector 220 can be any appropriate detector having the capability to detect electromagnetic radiation. The first detector 230 and the second detector 220 can be charge-coupled devices (CCDs), photodiodes (including avalanche photodiodes, APDs), photomultiplier tubes (PMTs; including silicon photomultipliers, SiPMs), or bolometers. The first detector 230 and the second detector 220 can be of the same brand or type or of different brands or types. In some embodiments, the first detector 230 is configured to receive forward scattered light, extinction light, or both and the second detector 220 is configured to receive fluorescence light, side-scattered light, or both. In some embodiments, the first detector 230 is configured to receive forward fluorescence light, and the second detector 220 is configured to receive side fluorescence light.

In some embodiments, one or more illumination optical elements 212 may be used to direct or focus light from the electromagnetic radiation source 210 onto the particle 101 in the microfluidic channel 110. The illumination optical elements 212 can include reflective or refractive elements, lenses, gradient index elements, mirrors, fiber optics or fiber optic components, waveplates, spatial filters, or spectral filters.

In some embodiments, one or more forward detection optical elements 232 are located between the substrate 112 and the first detector 230. The forward detection optical elements 232 can include reflective or refractive elements, lenses, mirrors, fiber optics or fiber optic components, waveplates, spatial filters, or spectral filters. In some embodiments, the forward detection optical elements 232 can include a first lens 232*a* and a second lens 232*b*. In some embodiments, the first lens 232*a* and the second lens 232*b* can be arranged in a 4-f relay lens arrangement. In some embodiments, the forward detection optical elements 232 can include spectral filters or other optical elements to enable separate detection of forward scattered light and extinction light at the first detector 230. In some embodiments, the forward detection optical elements 232 can include spectral filters or other optical elements to enable separate detection of fluorescent light from excitation light at the first detector 230.

In some embodiments, one or more side detection optical elements 222 are located between the substrate 112 and the second detector 220. The side detection optical elements 222 can include reflective or refractive elements, lenses, mirrors, fiber optics or fiber optic components, waveplates, spatial filters, or spectral filters. In some embodiments, the side detection optical elements 222 can include a first lens 222*a* and a second lens 222*b*. In some embodiments, the first lens 222*a* and the second lens 222*b* can be arranged in a 4-f relay lens arrangement. In some embodiments, the side detection optical elements 222 can include spectral filters or other optical elements to enable separate detection of fluorescence light and side-scattered light at the second detector 220.

Through choice of appropriate side detection optical elements 222 and forward detection optical elements 232, a numerical aperture can be established for the forward and side directions, respectively. The numerical aperture N for an optical system, set of detection optics, or single lens is defined as the ratio of the focal length f to the diameter of the entrance pupil D. The numerical aperture characterizes the range of angles over which the system, focusing optics, or lens can accept light. In some embodiments, devices, systems, and methods taught herein can provide a ratio of a side numerical aperture measured from a central portion of the microfluidic channel through the first side surface and a forward numerical aperture measured from the central portion of the microfluidic channel through the top surface or the bottom surface that is in a range from 1:2 to 1:1.

In some embodiments, a path length along the side-directed light path 30 from the center of the microfluidic channel 110 to the second detector 220 can be the same as a path length along the forward-directed light path 40 from the center of the microfluidic channel 110 to the first detector 230. This symmetric arrangement improves ease of alignment of the components of each light path relative to the particle processing chip 100. In some embodiments, the symmetric arrangement improves economies of scale by allowing the use of identical optical components and detectors along the forward-directed light path 40 and the side-directed light path 30. In some embodiments, the symmetric arrangement improves alignment consistency of the particle processing chip 100 with respect to the optical components and associated detectors along the forward-directed light path 40 and the side-directed light path 30.

FIGS. 5A-5D illustrate the optical problems associated with illuminating conventional particle processing chips having a microfluidic channel located in a central portion of the chip away from a side surface. FIG. 5A illustrates an end view of the conventional particle processing chip 10A wherein simulated light rays are launched from the center of the microfluidic channel 110A of the chip 10. This configuration models the use of an illumination light path 20A that is perpendicular to a top surface of the conventional particle processing chip 10A and illuminates the microfluidic channel 110A located in a central portion of the chip 10A away from any side surfaces. As taught above in relation to FIGS. 1A and 1B, the interrogation region 142A of microfluidic channel 110A is positioned at or near the center longitudinal axis 168A of the chip. A selection of light rays that can intercept the lenses and detector are illustrated along the forward-directed light path 40A and the side-directed light path 30A. FIG. 5B illustrates a zoomed in view of the substrate from FIG. 5A in the vicinity of the first side surface 113A.

In this simulation, the thickness of the substrate 112A is 1 mm and the center of the microfluidic channel 110A in cross-section is located 10 mm from the first side surface 113. Both the forward-directed light path 40A and the side-directed light path 30A are illustrated. The first lens 222a on the side-directed light path 30A and the first lens 232a on the forward-directed light path 40A are both located 9.149 mm from the respective side surfaces of the chip.

As illustrated in FIG. 5B, almost all of the rays undergo multiple reflections at the interface between the top surface 117A and the surrounding air and the interface between the bottom surface 118A and the surrounding air. As a result, few rays are captured and focused onto the second detector 220 by the side detection optical elements 222a, 222b. Moreover, the few rays that arrive at the detector are poorly focused leading to an unwieldy spot size far greater than the diffraction-limited spot size expected for these focusing optical elements 222a, 222b. The change is evident when comparing the bundle of light rays that arrives at the second detector 220 as compared to the bundle of rays that arrives at the first detector 230. The focal point at the first detector 230 along the forward-directed light path 40A suffers from fewer defects as compared to the light arriving at the second detector 220. Thus, imaging of the microfluidic channel 110A when the microfluidic channel 110A is such a large distance from the first side surface 113A provides poor results wherein imaging is generally impossible. In light of these poor results, it was previously understood that simultaneous imaging along a side-directed light path through an edge of the conventional particle processing chip and a forward-directed light path through the top or bottom surface was not advisable. In addition, the effective numerical aperture through the side surface is far below the diffraction-limited performance of the optical system and, thus, the ratio of the side numerical aperture to the forward numerical aperture is very low.

A number of additional disadvantages arise with the optical arrangement of FIGS. 5A and 5B. There is little ability to image a particle within the microfluidic channel in any image plane or to clearly spatially filter light originating at a particle due to the presence of multiple reflections. Moreover, there will be light loss due to total internal reflection at the first bounce from the microfluidic channel section because of refractive index mismatches. Light emitted or scattered from within the microfluidic channel has a long path length and high cumulative absorption before exiting the chip as the light travels so far within the chip before exiting and being steered to the detector. Thus, there is little to no ability to measure particles as coincidence events and, thus, it is difficult to reliably measure individual particles and characterize them without such measurements potentially being contaminated by light from neighboring particles, let alone being able to physically separate them. Furthermore, the arrangement illustrated in FIGS. 5A and 5B does not allow for "hot swapping" in the particle processing system between the particle processing chip and a jet-in-air nozzle because of the difference in path length required for the optics.

Multiple reflections from the top surface 117A and the bottom surface 118A could be defeated by, for example, placing absorbing coatings on the top surface 117A and the bottom surface 118A. However, such a measure to eliminate reflected rays leaves an extremely narrow accessible ray bundle. The half-angle for the cone of rays that can travel from the center through the side surface is $\tan^{-1}(0.5 \text{ mm}/10 \text{ mm}) \approx 2.9°$ or 0.05 radians. In the case of certain optical signatures such as fluorescence, emission from the particle 101 in the microfluidic channel 110A occurs over a full solid angle of $4\pi$ steradians. Positioning of the interrogation region 142A of the microfluidic channel 110A at or near the center longitudinal axis 168A in a conventional particle processing chip 10A causes the side surface 113A of the chip to intercept a limited portion (as measured in steradians) of the full solid angle.

FIGS. 5C-5E illustrate additional views of the conventional particle processing chip 10.

The particle processing chip 100 of the present disclosure overcomes difficulties in imaging light emitted or scattered from the microfluidic channel 110 through the side surface 113 by positioning the interrogation region 142 of the microfluidic channel 110 in the channel region 144 proximate to the side surface 113. Simulated optical ray tracing results for particle processing chips 100 according to the present disclosure are discussed next.

Figures 6C, 6D, 6E:
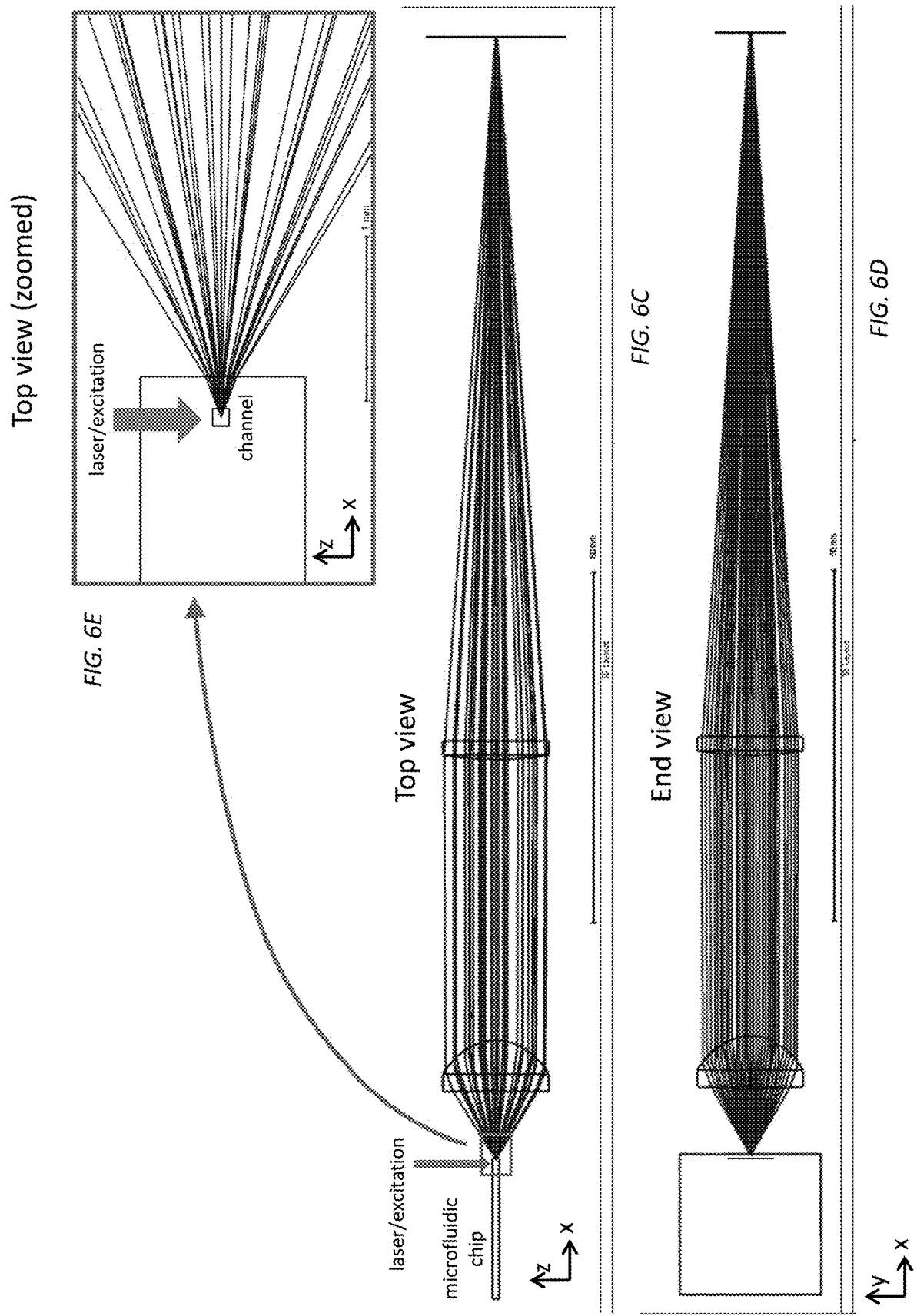
FIGS. 6C-6F illustrate additional views of the particle processing chip of FIG. 6A.
Figure 6F:
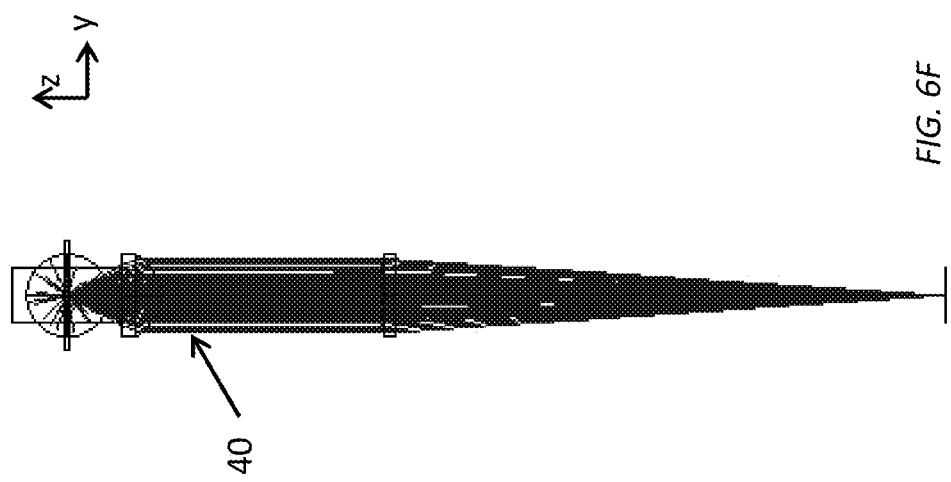

To demonstrate the advantages of systems and methods taught herein, a ray-tracing simulation was performed to compare the quality and quantity of light collected from the conventional particle processing chip 10A with an exemplary particle processing chip 100 of the present disclosure. FIG. 6A illustrates an end view of an exemplary particle processing chip 100 according to the present disclosure under the similar orthogonal imaging conditions as the conventional chip 10A illustrated in FIGS. 5A-5B. The configuration models the situation where the electromagnetic radiation source 210 illuminates the chip 100 through the top surface 117 and the illumination light path 20 is perpendicular to the top surface 117. The illumination light path 20 is directed to the microfluidic channel 110 in the channel region 144 abutting or next to the side surface 113. In this simulation, the thickness 119 of the substrate 112 is 1 mm and the center of the microfluidic channel 110 is located 0.25 mm from the first side surface. Both the forward-directed light path 40 and the side-directed light path 30 are illustrated. FIG. 6B illustrates a zoomed-in version of FIG. 6A centered in the proximity of the side surface 113. As illustrated, a large cone of rays is emitted through both the bottom and side of the substrate 112. Due to the proximity of the microfluidic channel 110 to the side surface 113, rays can be emitted over a large angle while avoiding reflection at the top surface 117 or bottom surface 118. In other words, a large cone of rays can pass from the center of the microfluidic channel 110 to and through the side surface 113 directly without first undergoing at least one reflection. The spot size of the collected bundle of rays on the second detector 220 along the side-directed light path 30 is nearly identical to the spot size of the collected bundle of rays on the first detector 230 along the forward-directed light path 40. In some embodiments, the location of the microfluidic channel 110 near the side surface 113 causes the side surface of the chip to intercept a limited portion of the full solid angle. Thus, a greater proportion of rays through the side surface 113 are able to be captured using focusing optics for the particle processing chip 100 of the present disclosure as opposed to conventional chips. The high throughput of light along both forward-directed and side-directed light paths (through bottom and side surfaces, respectively) enables simultaneous detection of light in both directions from a particle in a particle processing chip. In addition, FIG. 6B shows that the angular spread in the bundle of rays intercepted by the side-detection optical elements 222a, 222b is the same as the angular spread in the bundle of rays intercepted by the forward-detection optical elements 232a, 232b. Hence, the ratio of the side numerical aperture through the side surface and the forward numerical aperture through the bottom surface 118 is approximately equal to 1 in this example.

By avoiding the problem of multiple reflections within the substrate, the particle processing chip 100 taught in various embodiments enables imaging of one or more particles within the microfluidic channel 110 and spatial filtering of light originating with the one or more particles (e.g., through use of spatial masks). Because the light pathways can be symmetric, a particle processing system could interchangeably use the particle processing chip 100 and a jet-in-air nozzle interchangeably with minimal adjustment. The shorter path length and avoidance of multiple reflections also prevents absorption losses from accumulating as light rays attempt to exit the chip.

FIGS. 6C-6F illustrate additional views of the particle processing chip 100 according to various embodiments taught herein.

Figures 7A, 7B:
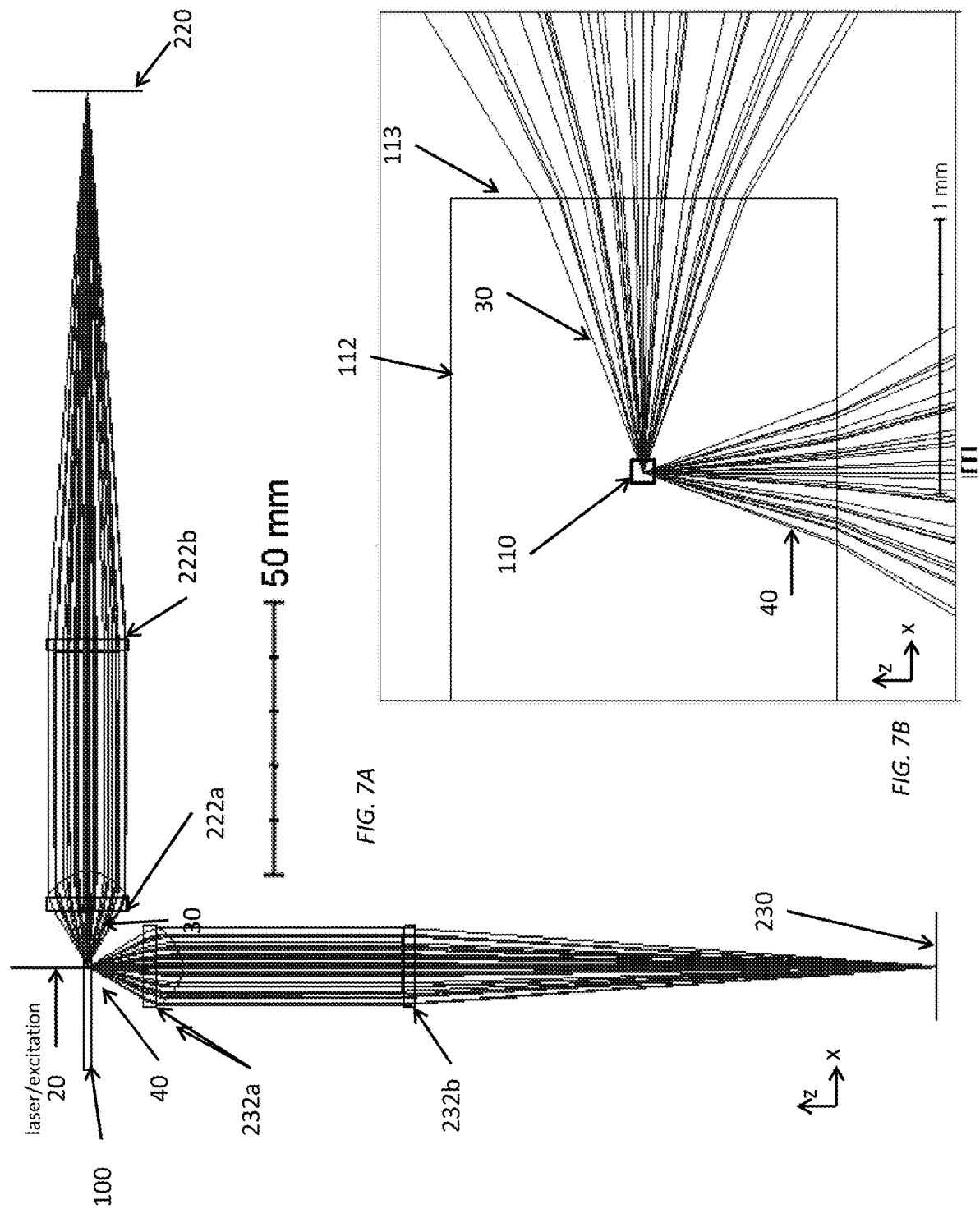
FIG. 7A illustrates an end view of an optical simulation for another embodiment of a particle processing chip in accordance with the present disclosure.
FIG. 7B illustrates a zoomed in view of FIG. 7A.

FIG. 7A illustrates an end view of an exemplary particle processing chip 100 according to the present disclosure with different substrate thickness and different placement of the microfluidic channel 110 as compared to the particle processing chip illustrated in FIGS. 6A-6B. In this embodiment, the substrate is 1.4 mm thick and the center of the microfluidic channel 110 is located 1 mm from the side surface 113. The configuration models the situation where the electromagnetic radiation source 210 illuminates the chip 100 through the top surface 117 and the illumination light path 20 is perpendicular to the top surface 117. The illumination light path 20 is directed to the microfluidic channel 110 in the channel region 144 abutting or next to the side surface 113. FIG. 7B illustrates a zoomed in view of FIG. 7A centered in the proximity of the side surface 113. As in the earlier embodiment with the thinner substrate, rays directed along the side-directed light path 30 and the forward-directed light path 40 pass along substantially similar trajectories and can be well-focused at the respective detectors. Due to the proximity of the microfluidic channel 110 to the side surface 113, rays can be emitted over a large angle and still avoid reflection at the top surface 117 or bottom surface 118. In other words, a large cone of rays can pass from the center of the microfluidic channel 110 to the side surface 113 directly without first undergoing at least one reflection.

Figure 8:
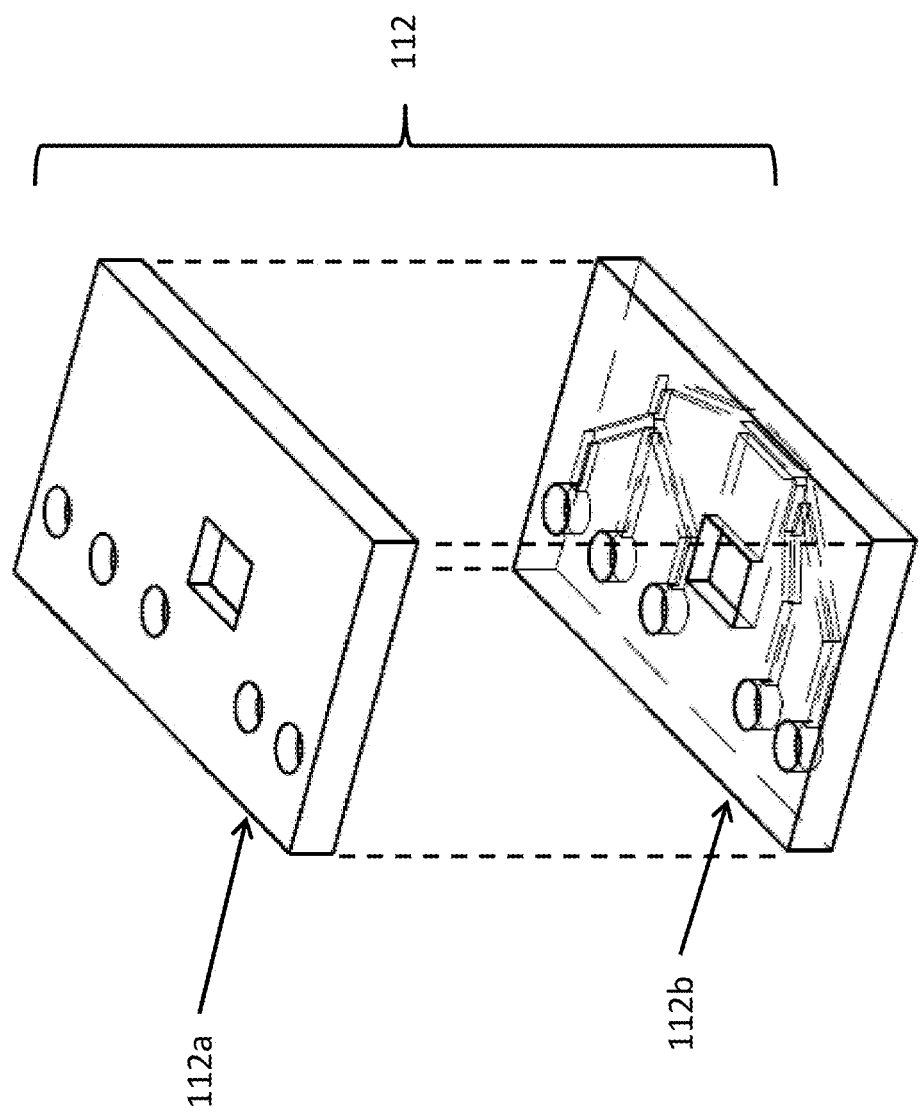
FIG. 8 illustrates an exploded view of the substrate according to some embodiments taught herein.

FIG. 8 illustrates an exploded view of the substrate 112 according to some embodiments taught herein. In this embodiment, the substrate 112 includes a first layer 112a and a second layer 112b that can be placed into contact (directly or indirectly) to form the completed substrate 112. The first layer 112a and the second layer 112b can be physically coupled (e.g., bonded) together using any compatible joining technology including adhesives, ultrasonic welding, or any other suitable process as understood by one skilled in the art. The bond can be sufficiently tight to prevent fluid leakage between the first layer 112a and the second layer 112b. In some embodiments, the adhesive can be index matched with the first layer 112a, the second layer 112b, or both. The bond can create a seamless transition between the first layer 112a and the second layer 112b such that light rays traveling between the first layer 112a and the second layer 112b do not encounter a material discontinuity or air gap that could cause refraction or reflection of the light ray. Although embodiments of the substrate 112 are taught herein as having one layer or two layers (i.e., a first layer 112a and a second layer 112b), it is contemplated that a greater number of layers could be used to construct a multi-layer substrate. For example, the substrate 112 could include three layers, four layers, five layers, or more layers.

The first layer 112a and the second layer 112b can be formed from any suitable material. In some embodiments, the first layer 112a and the second layer 112b can include fused silica (including ultraviolet-grade fused silica), lithium niobate, borosilicate (e.g., BK7), Cyclic Olefin Copolymer (COC), Cyclo Olefin Polymer (COP), or other suitable optically-compatible materials. The first layer 112a and the second layer 112b can include the same or different materials in various embodiments. In some embodiments, an index of refraction of the first layer 112a can be greater than an index of refraction of the second layer 112b. In some embodiments, the first layer 112a can include a piezo-active material that couples with the actuator disposed at the chamber 140 to enable focusing or manipulation of the location of one or more particles within the fluid stream. In some embodiments, the piezo-active material of the first layer 112a acts as the actuator itself thus obviates the need to couple a separately formed actuator to the particle processing chip 100.

In some embodiments, the substrate 112, first layer 112a, or second layer 112b or any combination thereof can be manufactured using an injection-molding process.

In some embodiments, particularly where the index of refraction of the first layer 112a is greater than the index of refraction of the second layer 112b, certain rays originating in the microfluidic channel 110 can be refracted, reflected, or otherwise absorbed, deflected, or both at the interface between layers causing these rays to fail to intercept the focusing optics. These rays are thus not received by the detector. The loss of rays in a multi-layer substrate is illustrated below with respect to FIGS. 9A-9E.

FIG. 9A illustrates an optical simulation wherein the microfluidic channel 110 is disposed in the second layer 112a and the center of the microfluidic channel 110 lies 10 μm below the interface between the first layer 112a and the second layer 112b. FIGS. 9B and 9C illustrate progressively greater magnifications of the same simulation as illustrated in FIG. 9A centered in the vicinity of the microfluidic channel 110. In this example, the first layer 112a includes lithium niobate (LiNbO$_3$) and the second layer 112b includes ultraviolet-grade fused silica (UVFS). Some of the rays deflect strongly at the material interface and are then totally internally reflected at other surfaces within the chip such as side surface 113. This light does not reach the detector thus reducing the resulting optical signal that can be detected from the particle within the microfluidic channel 110.

Figure 9D:
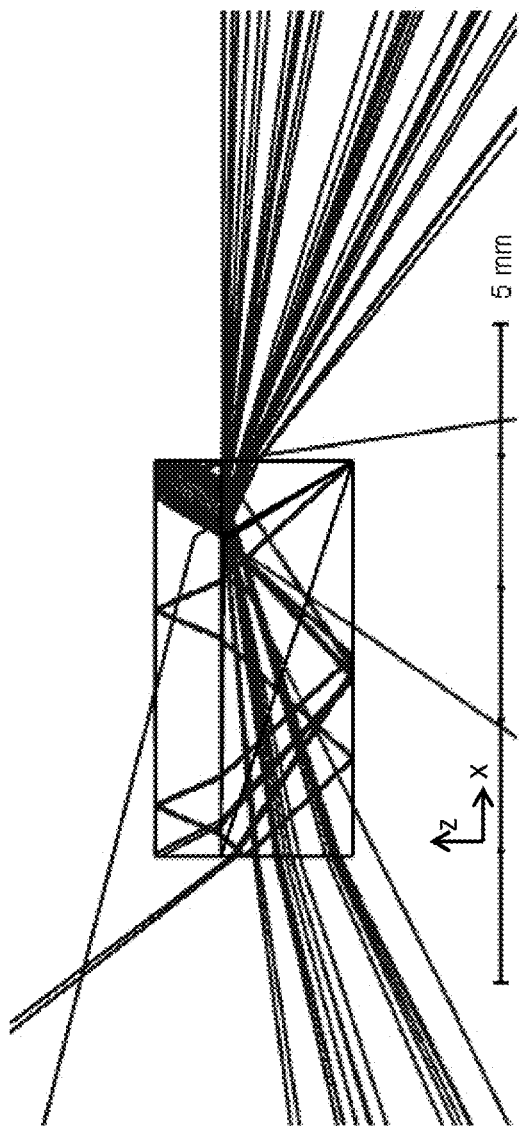
FIG. 9D illustrates a different ray-trace simulation of the bi-layer chip of FIG. 9A.
Figure 9E:
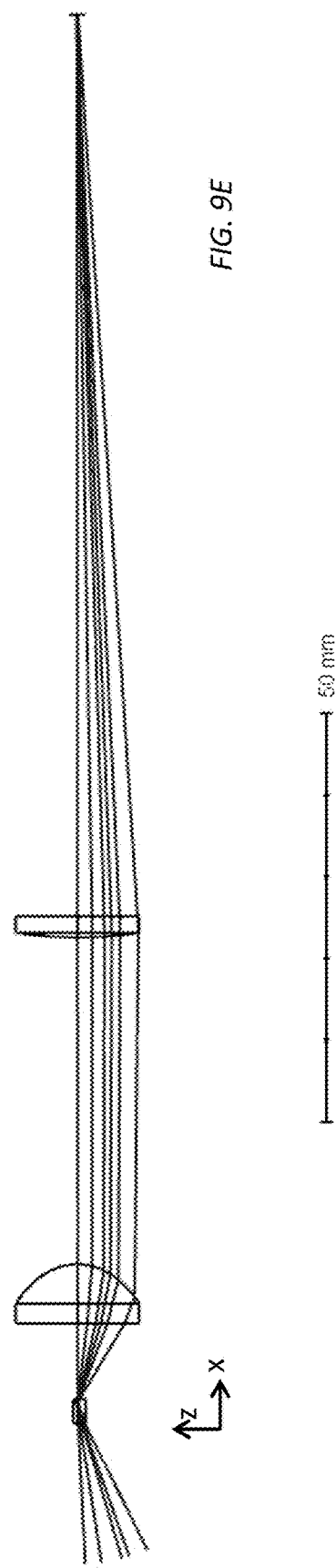
FIG. 9E illustrates an optical system including the bi-layer chip of FIG. 9A.

FIG. 9D illustrates a different ray-trace simulation of the same bi-layer chip of FIG. 9A. FIG. 9E illustrates an optical system including the bi-layer chip of FIG. 9A. No light rays exit the chip through the side surface 113 above the line dividing the first layer 112a and the second layer 112b. That is, light only exits the side surface 113 of the substrate 112 through the first layer 112a as illustrated by the vertical asymmetry in light rays proceeding through the system to the detector.

Figure 10A:
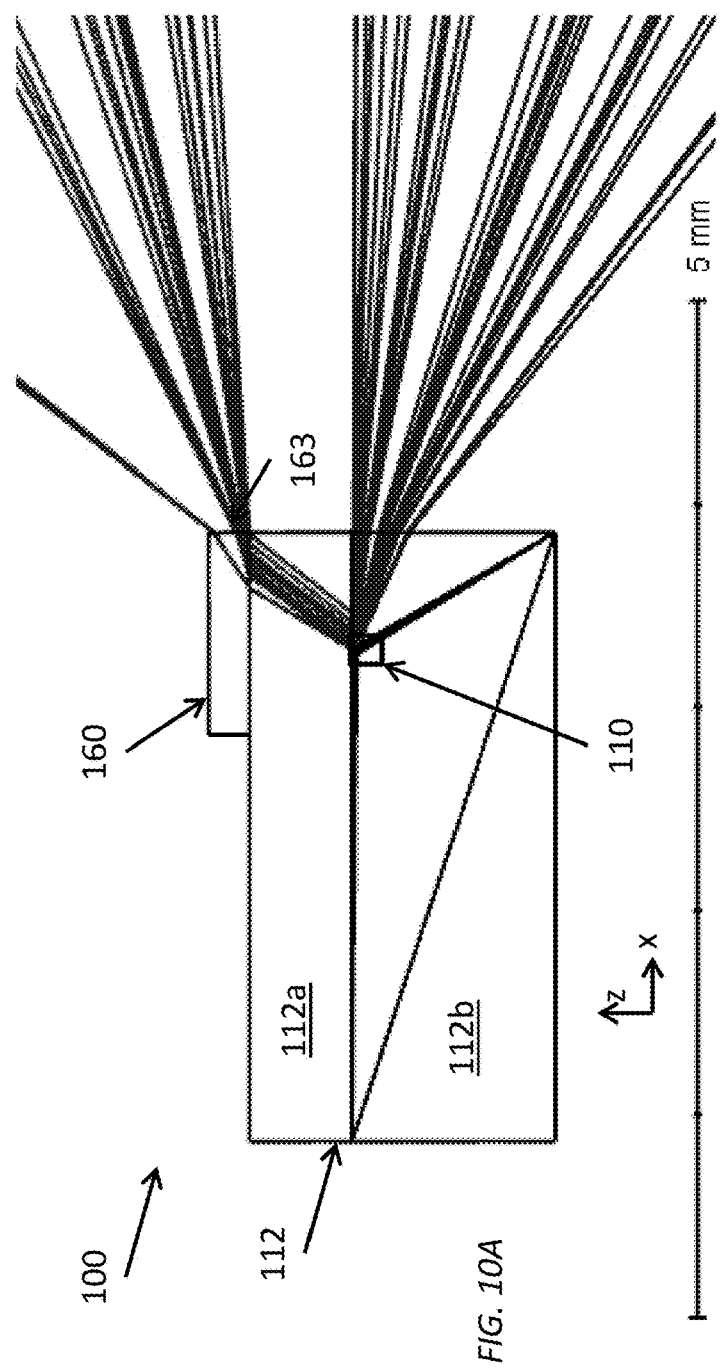
FIG. 10A illustrates an exemplary particle processing chip as taught herein including a light out-coupler in accordance with various embodiments of the present disclosure.
Figure 10B:
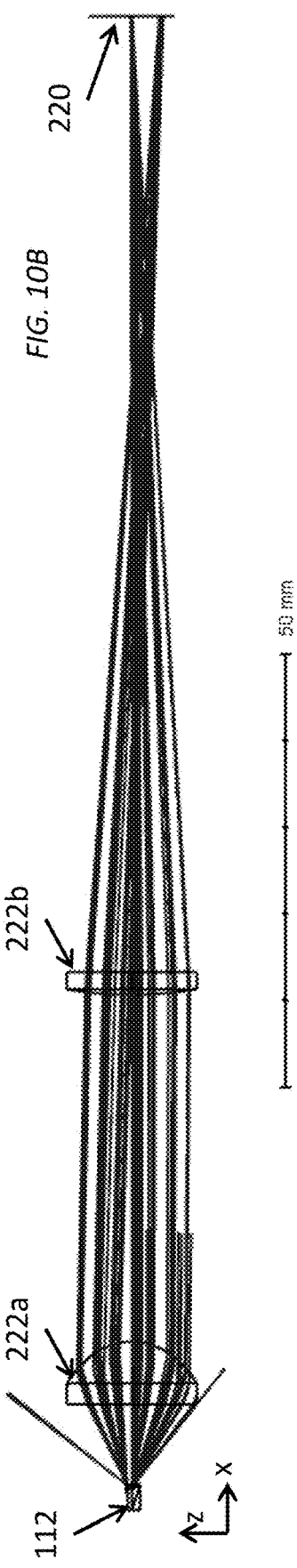
FIG. 10B illustrates an exemplary particle processing chip as taught herein including a light out-coupler placed into an exemplary particle processing system in accordance with various embodiments of the present disclosure.

The loss of light described with respect to FIGS. 9A-9E and caused by construction of the substrate using layers with different refractive indices can be mitigated using several additional features discussed now with respect to FIGS. 10A-10B and 11A-11C. FIG. 10A illustrates a particle processing chip 100 wherein a light out-coupler 160 is attached to the substrate 112. The light out-coupler 160 can have an index of refraction that is lower than the index of refraction of the first layer 112a. The light out-coupler 160 can act to redirect high-angle rays that would pass out of the substrate 112 through the top surface 117 in the absence of the light out-coupler 160. In the presence of the light out-coupler 160, these high-angle rays instead pass through a side surface 163 of the light out-coupler 160 such that they are predominantly traveling along the side-directed light path. FIG. 10B illustrates the particle processing chip 100 including the light out-coupler 160 placed into the particle processing system including side focusing optical elements 222a, 222b and the second detector 220. The bundle of rays that is redirected from the light out-coupler 160 is captured by the side focusing optical elements 222a, 222b and focused at a different location upon the second detector 220. Although the wayward bundle of rays is focused at a different location, the light is still captured at the second detector 220 and is not lost to the system.

In some embodiments, the light out-coupler 160 can be physically coupled (e.g., bonded) to the substrate 112, for example, the first layer 112a of the substrate 112. The light out-coupler 160 can be mechanically coupled or bonded using adhesives, ultrasonic welding, or other suitable methods. In some embodiments, the light out-coupler 160 can have a thickness of 100 µm. In some embodiments, the light out-coupler 160 can include ultraviolet-grade fused silica. In some embodiments, the light out-coupler 160 can include the same materials as the second layer 112b of the substrate 112.

Figure 11A:
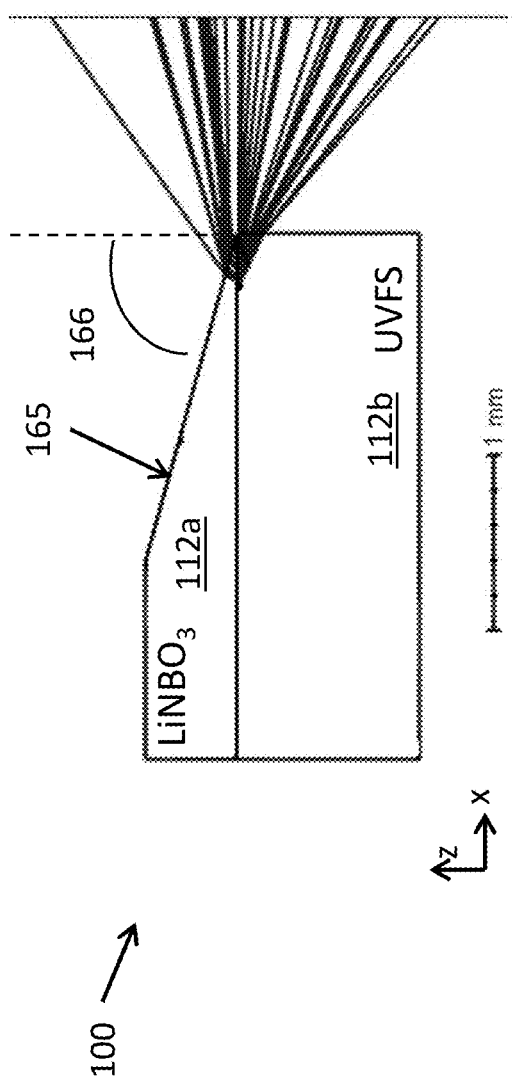
FIG. 11A illustrates an exemplary particle processing chip including a chamfered edge at a side surface in accordance with various embodiments of the present disclosure.
Figure 11B:
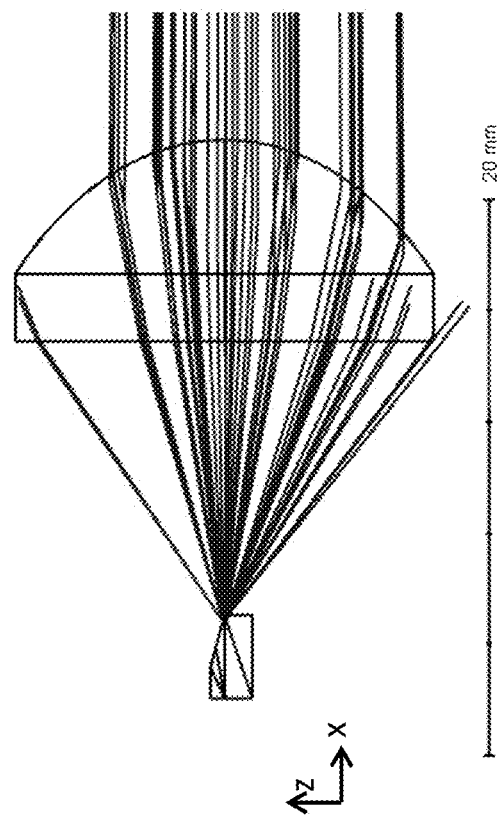
FIG. 11B illustrates a zoomed-out view of the particle processing chip of FIG. 11A.
Figure 11C:
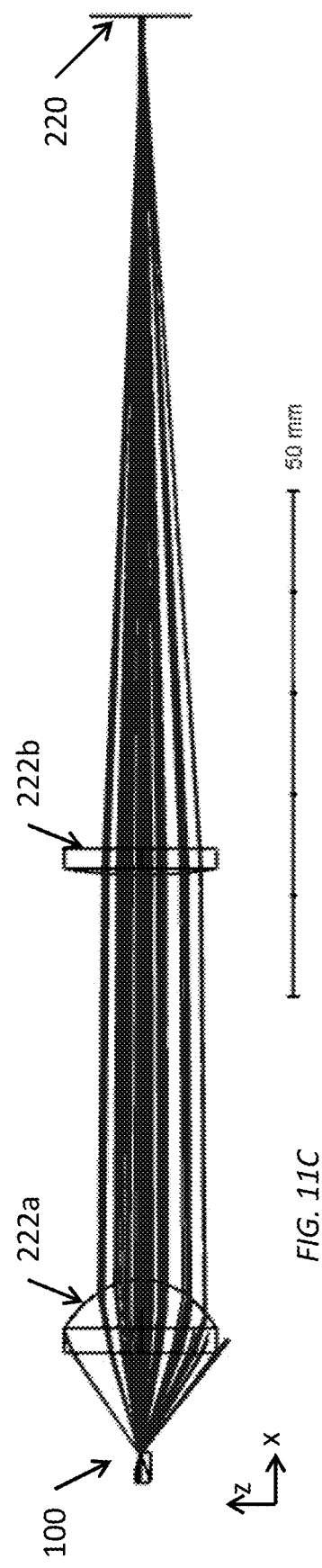
FIG. 11C illustrates an exemplary particle processing chip including a chamfered edge at a side surface placed into an exemplary particle processing system in accordance with various embodiments of the present disclosure

FIG. 11A illustrates the particle processing chip 100 including a chamfered edge 165. FIG. 11B illustrates a zoomed-out view of the particle processing chip 100 including the chamfered edge 165. The chamfered edge (or other geometrical shape of the substrate) 165 can reduce total internal reflection from surfaces of the first layer 112a and increase out-coupling of light. In some embodiments, the chamfered edge 165 can be formed in the first layer 112a. In this simulation, the center of the microfluidic channel 110 is located 0.3 mm from the side surface 113. In some embodiments, the exterior angle 166 of the chamfered edge 165 with respect to an axis parallel to the side surface 113 is in a range from 60° to 90°. In an exemplary embodiment, the exterior angle 166 is 75°. FIG. 11C illustrates the particle processing chip 100 of FIG. 11A in the particle processing system including side focusing optical elements 222a, 222b and the second detector 220. The light emitted from the face of the chamfered edge 165 is captured by the side focusing optical elements 222a, 222b and focused onto the second detector 220. A significant proportion of the high-angle light rays that would have been lost in the absence of the chamfered edge 165 in a multi-layer substrate can be recovered through use of the chamfered edge 165.

Note that the chamfered edge 165 is different than the beveled edge 14 of the substrate 12B of FIG. 1C. Specifically, the angle of the chamfered edge 165 is selected to facilitate refraction and out-coupling of light in a forward-going direction from the angled surface whereas the beveled edge 14 is designed for reflection of the light from the angled surface to redirect the light through the bottom surface of the substrate.

FIG. 12 illustrates a top view of another embodiment of the particle processing chip 100'. In this embodiment, the substrate 112 defines the center longitudinal axis 168 between two opposing side surfaces. For example, opposing side surfaces 113 and 115 can be used to define the center longitudinal axis 168. The center longitudinal axis 168 divides the substrate 112 into a first half 109 and a second half 111. The microfluidic channel 110' can be disposed entirely in the first half 109. In some embodiments, the half of the substrate 112 (e.g., second half 111) opposing the half of the substrate 112 with the microfluidic channel 110' (e.g., first half 109) includes no etched features. By shifting all of the etched components (e.g., the microfluidic channel 110' and chamber 140) to a single half of the substrate 112, empty space in the opposite half is generated that can be used for other aspects of particle processing or for labeling of the particle processing chip, etc.

FIG. 13 illustrates a top view of another embodiment of the particle processing chip 100" including multiple microfluidic systems that each include a microfluidic channel 110', 110" as taught herein. The first microfluidic channel 110' and the second microfluidic channel 110" illustrated in FIG. 12 are fluidically isolated from one another in accordance with various embodiments taught herein. The substrate 112 defines a center longitudinal axis 168 between two opposing side surfaces 113, 115. The center longitudinal axis 168 divides the substrate 112 into a first half 109 and a second half 111. The first microfluidic system is disposed entirely in the first half 109 and the second microfluidic system is disposed entirely in the second half 111. An interrogation region 142' of the first microfluidic channel 110' lies in a first channel region 144' of the substrate 112. An interrogation region 142" of the second microfluidic channel 110" lies in a second channel region 144" of the substrate 112.

The arrangement of the first microfluidic channel 110' and the second microfluidic channel 110" on a single particle processing chip allows for multiplexing of sample processing by enabling light detection through multiple side surfaces. In some embodiments, the particle processing system employing the particle processing chip 100" including multiple microfluidic channels 110', 110" can include a second set of side-focusing optical elements similar to the side-focusing optical elements 222 taught above and a third detector similar to the second detector 220 taught above. The second set of side-focusing optical elements and the third detector can be located proximate to the second side surface 115 to receive light emitted from the second microfluidic channel 110" through the second side surface 115. The light emitted through the second side surface 115 can proceed along a light path parallel to and directed oppositely from the side-directed light path 30 taught above in relation to FIG. 2A.

Figure 14B:
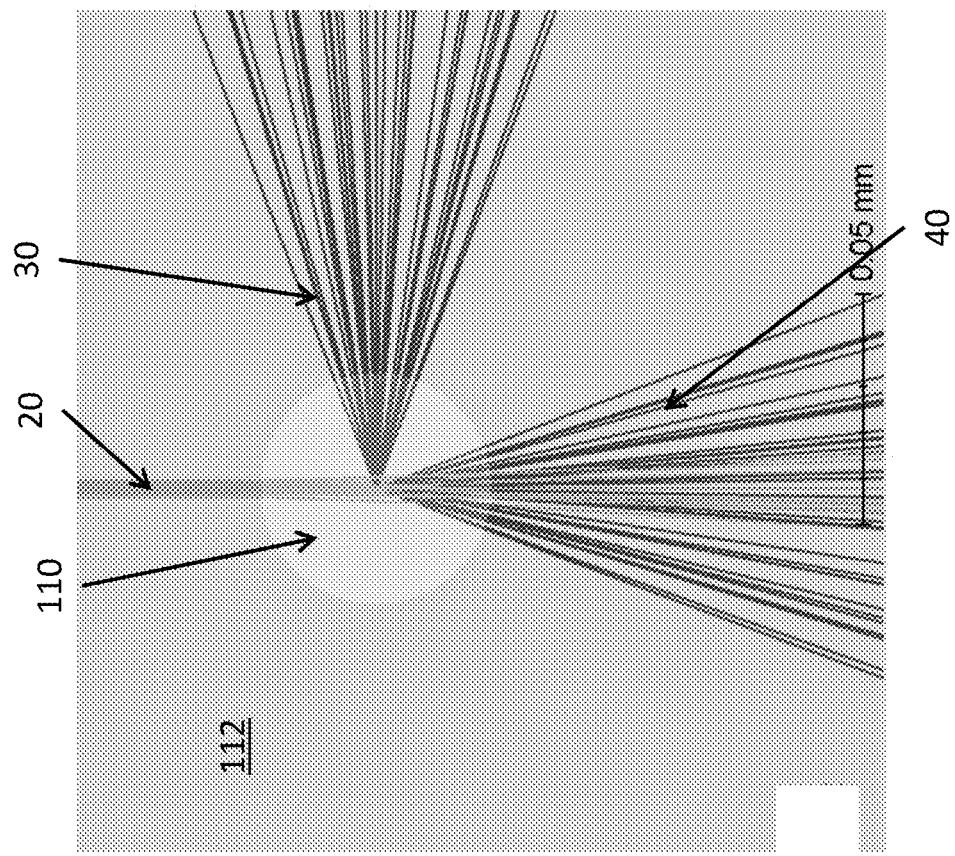
FIG. 14B illustrates an end e of the chip of FIG. 14A.
Figure 14A:
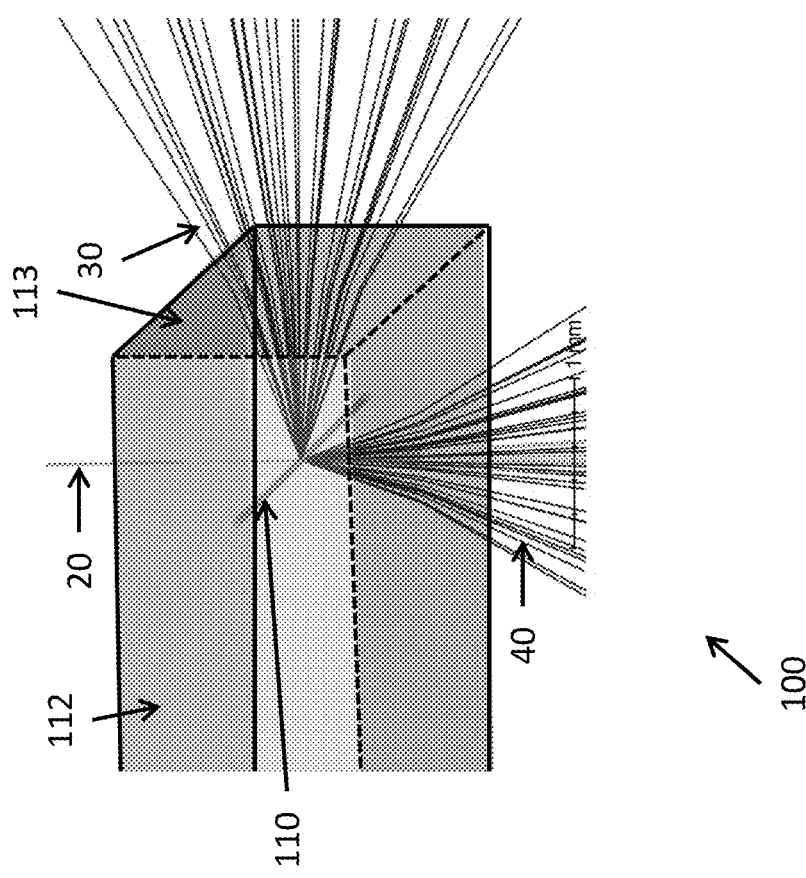
FIG. 14A illustrates a perspective view of an exemplary particle processing chip as taught herein.
Figure 14C:
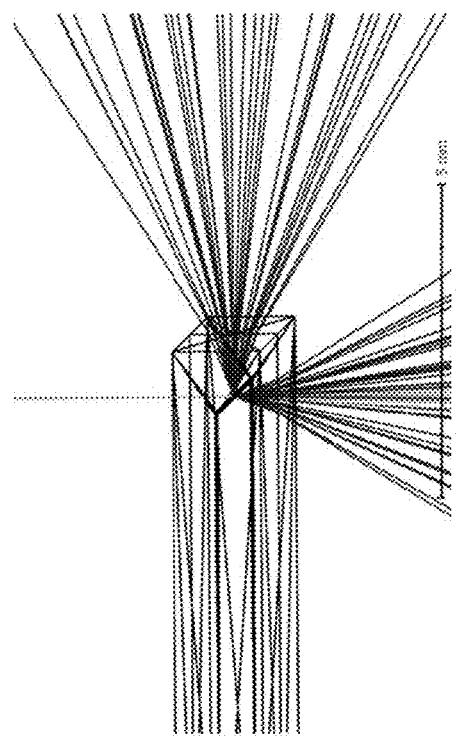
FIGS. 14C and 14D illustrate similar views as FIGS. 14A and 14B, respectively, using wire-frame models.
Figure 14D:
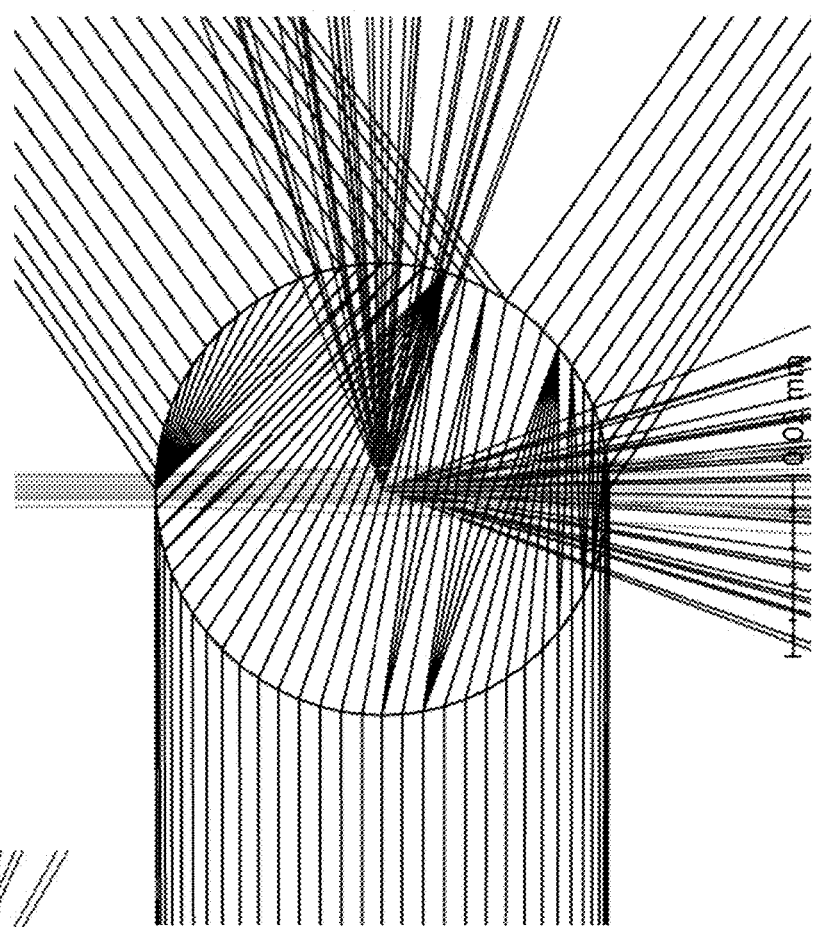

FIG. 14A illustrates a perspective view of the particle processing chip 100 of the various embodiments taught herein. The microfluidic channel 110 in this depiction has a diameter of 50 µm and is located in the substrate such that the center of the microfluidic channel 110 is 1 mm from the side surface 113. The configuration models the situation where the electromagnetic radiation source 210 illuminates the chip 100 through the top surface 117 and the illumination light path 20 is perpendicular to the top surface 117. The illumination light path 20 is directed to the microfluidic channel 110 in the channel region 144 abutting or next to the side surface 113. FIG. 14B illustrates an end view of the simulated particle processing chip 100 of FIG. 14A. FIGS. 14C and 14D illustrate the same views as FIGS. 14A and 14B but using wire-frame rendering for the model structures rather than solid surfaces FIGS. 15A and 15B illustrate ray-trace simulations of longitudinal refraction for rays exiting the microfluidic channel 110 and entering the substrate 112 (i.e., rays at the channel boundary). In these figures, the view of the chip is oriented such that the flow direction within the microfluidic channel 110 is vertical. FIG. 15A illustrates the refraction of rays traveling from the microfluidic channel 110, which has an index of refraction roughly equivalent to seawater, into the substrate 112 including ultraviolet-grade fused silica (UVFS) having an index of refraction n=1.465. FIG. 15B illustrates the refraction of rays traveling from the microfluidic channel 110 into the substrate 112 including a variety of flint glass (SF59) having an index of refraction n=2.00. As is illustrated, there is not a significant difference in refraction between the two types of substrate material.

Figure 16:
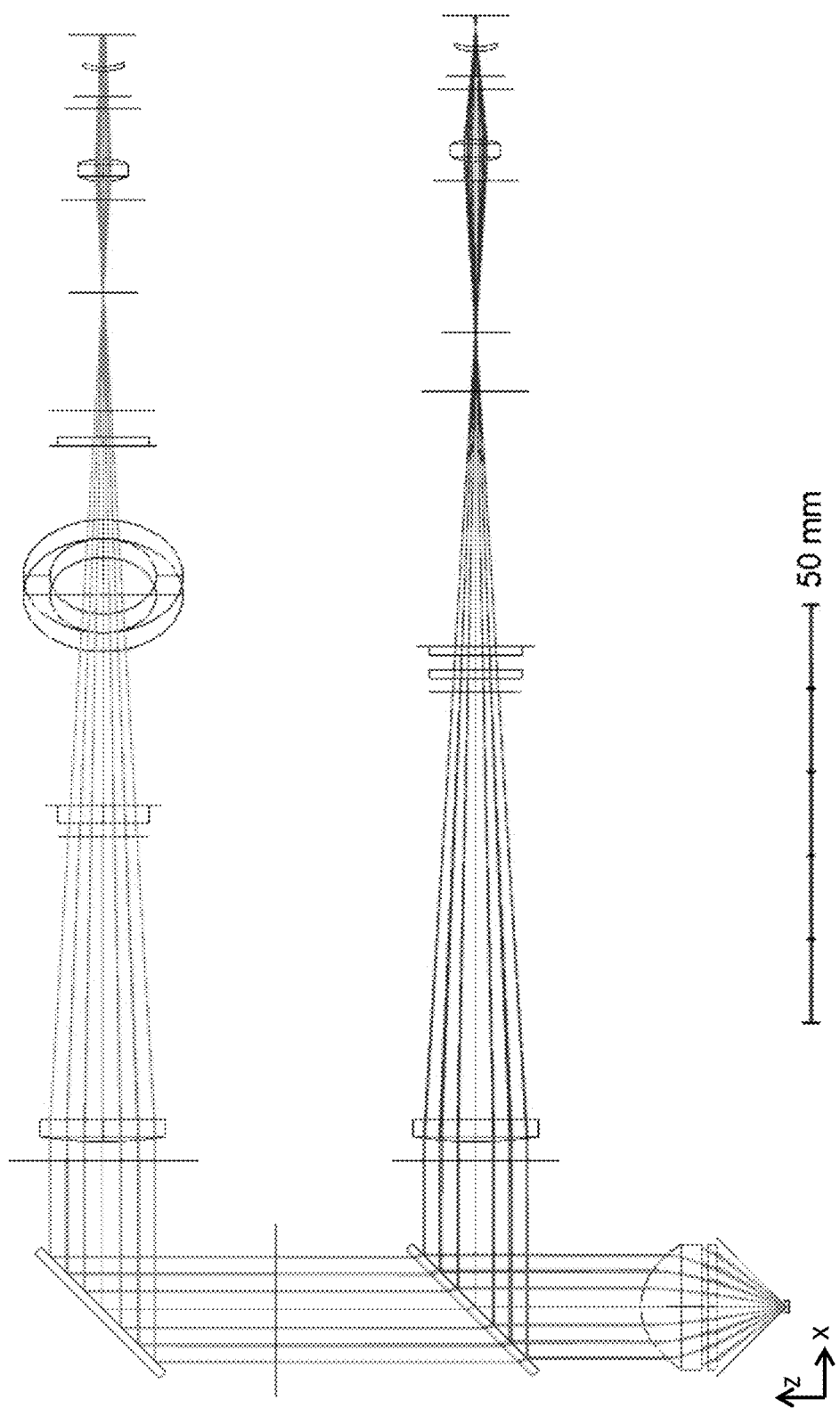
FIG. 16 illustrates an optical ray-trace simulation for an exemplary particle processing chip in an exemplary particle processing system in accordance with various embodiments taught herein.

FIG. 16 illustrates an optical ray-trace simulation for the particle processing chip 100 in the particle processing system 200 in accordance with some embodiments. In this embodiment, the optical elements in the particle processing system 200 are provided as part of a cell sorting system such as the Cytonome Viva™ (Cytonome/ST, LLC, Bedford, Mass.). Particle processing chips 100 as taught in this application can be used interchangeably with other cytometry technologies in a single particle processing system 200 such as the Cytonome Viva™. For example, a jet-in-air nozzle can be removed from the particle processing system 200 and the particle processing chip 100 can be placed into position. The replacement of a different modality such as jet-in-air with an on-chip modality can incur a need for only small adjustments or realignments to the positions of optical elements or detectors in the particle processing system 200.

Unless defined otherwise, all technical and scientific terms used herein have the same meaning as commonly understood by one of ordinary skill in the art to which this disclosure belongs. It is also to be understood that the terminology used herein is for the purpose of describing particular embodiments only, and is not intended to be limiting, since the scope of the present disclosure will be limited only by the appended claims. Although any methods and materials similar or equivalent to those taught herein can also be used in the practice or testing of the present disclosure, the preferred methods and materials are now taught.

As will be apparent to those of skill in the art upon reading this disclosure, the embodiments taught herein have discrete components and features which may be readily, separated from or combined with the features of any of the other several embodiments without departing from the scope or spirit of the present disclosure. Any recited method can be carried out in the order of events recited or in any other order that is logically possible.

The invention claimed is:

1. A particle processing system comprising:
    a particle processing chip including:
        a substrate having a plurality of side surfaces, a top surface, and a bottom surface, the plurality of side surfaces defining a thickness of the substrate and the top surface and the bottom surface defining a width and a length of the substrate; and
        a microfluidic channel disposed in the substrate parallel to a first side surface of the plurality of side surfaces and located in the substrate relative to the first side surface to allow a maximal half-angle for a ray of light passing from a center of the microfluidic channel through the first side surface of between 25 degrees and 90 degrees;
    an electromagnetic radiation source to illuminate an interrogation region in the microfluidic channel through the bottom surface or the top surface of the substrate;
    a first detector to receive light from the microfluidic channel emitted through the top surface or the bottom surface of the substrate that is opposed to the electromagnetic radiation source; and
    a second detector to receive light from the microfluidic channel emitted through the first side surface of the substrate.

2. The particle processing system of claim 1, wherein the electromagnetic radiation source illuminates the microfluidic channel along a first axis, the first detector receives light along the first axis, and the second detector receives light along a second axis perpendicular to the first axis.

3. The particle processing system of claim 1, wherein the first detector receives scattered light and the second detector receives fluorescence light.

4. The particle processing system of claim 1, wherein the first detector receives fluorescence light and the second detector receives fluorescence light.

5. The particle processing system of claim 1, wherein the maximal half-angle is in a range between 25 degrees and 50 degrees.

6. The particle processing system of claim 1, wherein a ratio of a side numerical aperture measured from a central portion of the microfluidic channel through the first side surface and a forward numerical aperture measured from the central portion of the microfluidic channel through the top surface or the bottom surface is in a range from 1:2 to 1:1.

7. The particle processing system of claim 1, wherein the substrate comprises a first layer physically coupled to a second layer.

8. The particle processing system of claim 7, wherein an index of refraction of the first layer is greater than an index of refraction of the second layer.

9. The particle processing system of claim 7, wherein the first layer includes lithium niobate and the second layer includes fused silica.

10. The particle processing system of claim 7, wherein the first layer includes fused silica and the second layer includes fused silica.

11. The particle processing system of claim 7, wherein the first layer includes a beveled edge to reduce total internal reflection in the first layer and increase out-coupling of light.

12. The particle processing system of claim 1, further comprising a light out-coupler disposed on the substrate adjacent to an edge between the first side surface and the top surface.

13. The particle processing system of claim 12, wherein the light out-coupler has a thickness in a range from 50 microns to 500 microns.

14. The particle processing system of claim 1, further comprising a sample inlet in fluid communication with the microfluidic channel.

15. The particle processing system of claim 1, further comprising a sheath fluid inlet in fluid communication with the microfluidic channel.

16. The particle processing system of claim 1, further comprising a first outlet and at least a second outlet in fluid communication with the microfluidic channel.

17. The particle processing system of claim 16, further comprising a chamber in fluid communication with the microfluidic channel and operatively couplable to an actuator to selectively change position of individual particles in a fluid stream within the microfluidic channel to cause the selected individual particles to enter the first outlet or the second outlet.

18. The particle processing system of claim 17, wherein the actuator comprises a piezoelectric device and the chamber is a fluid-filled chamber.

19. The particle processing system of claim 1, wherein the microfluidic channel further comprises a hydrodynamic focusing region.

20. The particle processing system of claim 1, wherein the substrate defines a center longitudinal axis extending between two opposing side surfaces and dividing the substrate into a first half and a second half, the microfluidic channel disposed entirely in the first half or the second half.

21. The particle processing system of claim 20, wherein the half of the substrate opposing the half of the substrate with the microfluidic channel includes no etched features.

22. The particle processing system of claim 1, wherein the substrate is formed using an injection-molding process.

23. A particle processing chip comprising:
a substrate having a plurality of side surfaces, a top surface, and a bottom surface, the plurality of side surfaces defining a thickness of the substrate and the top surface and the bottom surface defining a width and a length of the substrate;
a microfluidic channel disposed in the substrate parallel to a first side surface of the plurality of side surfaces and located in the substrate relative to the first side surface to allow a maximal half-angle for a ray of light passing from a center of the microfluidic channel through the first side surface of between 25 degrees and 90 degrees.

24. The particle processing chip of claim 23, wherein the maximal half-angle is in a range between 25 degrees and 50 degrees.

25. The particle processing chip of claim 23, wherein a ratio of a side numerical aperture measured from a central portion of the microfluidic channel through the first side surface and a forward numerical aperture measured from the central portion of the microfluidic channel through the top surface or the bottom surface is in a range from 1:2 to 1:1.

26. The particle processing chip of claim 23, wherein the substrate comprises a first layer physically coupled to a second layer.

27. The particle processing chip of claim 26, wherein an index of refraction of the first layer is greater than an index of refraction of the second layer.

28. The particle processing chip of claim 26, wherein the first layer includes lithium niobate and the second layer includes fused silica.

29. The particle processing chip of claim 26, wherein the first layer includes fused silica and the second layer includes fused silica.

30. The particle processing chip of claim 26, wherein the first layer includes a beveled edge to reduce total internal reflection in the first layer and increase out-coupling of light.

31. The particle processing chip of claim 23, further comprising a light out-coupler disposed on the substrate adjacent to edge between of the first side surface and the top surface.

32. The particle processing chip of claim 31, wherein the light out-coupler has a thickness in a range from 50 microns to 500 microns.

33. The particle processing chip of claim 23, further comprising a sample inlet in fluid communication with the microfluidic channel.

34. The particle processing chip of claim 23, further comprising a sheath fluid inlet in fluid communication with the microfluidic channel.

35. The particle processing chip of claim 23, further comprising a first outlet and a second outlet in fluid communication with the microfluidic channel.

36. The particle processing chip of claim 35, further comprising a chamber in fluid communication with the microfluidic channel and operatively couplable to an actuator to selectively change position of individual particles in a fluid stream within the microfluidic channel to cause the selected individual particles to enter the first outlet or the second outlet.

37. The particle processing chip of claim 36, wherein the actuator comprises a piezoelectric device and the chamber is a fluid-filled chamber.

38. The particle processing chip of claim 23, wherein the microfluidic channel further comprises a hydrodynamic focusing region.

* * * * *